(12) United States Patent
Stebbings

(10) Patent No.: US 7,069,246 B2
(45) Date of Patent: *Jun. 27, 2006

(54) METHOD FOR MINIMIZING PIRATING AND/OR UNAUTHORIZED COPYING AND/OR UNAUTHORIZED ACCESS OF/TO DATA ON/FROM DATA MEDIA INCLUDING COMPACT DISCS AND DIGITAL VERSATILE DISCS, AND SYSTEM AND DATA MEDIA FOR SAME

(75) Inventor: David W. Stebbings, Washington, DC (US)

(73) Assignee: Recording Industry Association of America, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/660,547

(22) Filed: Sep. 12, 2003

(65) Prior Publication Data

US 2004/0052369 A1    Mar. 18, 2004

Related U.S. Application Data

(63) Continuation of application No. 09/315,012, filed on May 20, 1999, now Pat. No. 6,684,199.

(60) Provisional application No. 60/086,132, filed on May 20, 1998.

(51) Int. Cl.
   *G06F 17/60*    (2006.01)

(52) U.S. Cl. .................. 705/57; 705/51; 705/52; 705/59; 705/64; 713/182; 380/200; 380/201; 380/202; 380/203; 726/26; 726/27; 726/28; 726/29; 726/30; 726/32; 726/33

(58) Field of Classification Search .......... 705/1, 705/50–80; 713/1–100, 170, 182, 200; 380/200–204, 380/241; 726/26–33
See application file for complete search history.

(56) References Cited

U.S. PATENT DOCUMENTS

| | | | | |
|---|---|---|---|---|
| 5,832,084 A | * | 11/1998 | Park | 380/203 |
| 6,167,136 A | * | 12/2000 | Chou | 380/201 |
| 2004/0128514 A1 | * | 7/2004 | Rhoads | 713/176 |

FOREIGN PATENT DOCUMENTS

WO    WO 98/08180    * 2/1998

OTHER PUBLICATIONS

Brin et al., "Copy Detection Mechanisms for Digital Documents", 1995, ACM, p. 398-409.*
Starrett, "Hide and Seek announces non-intrusive CD copy protection", Aug. 1997, Proquest, 2 pages.*

* cited by examiner

*Primary Examiner*—James P. Trammell
*Assistant Examiner*—Jalatee Worjloh
(74) *Attorney, Agent, or Firm*—Irah H. Donner; Wilmer Cutler Pickering Hale and Dorr LLP

(57) ABSTRACT

A method authenticates at least one of a media and data stored on said media in order to prevent at least one of piracy, unauthorized access and unauthorized copying of the data stored on said media. At least one predetermined error is introduced with the data resulting in mixed data. The mixed data is optionally stored on the media. The at least one predetermined error includes at least one authentication key or component thereof, for authenticating whether the media and/or data is authorized. The method includes the following sequential, non-sequential and/or sequence independent steps: reading the mixed data from the media, detecting the at least one predetermined error from the mixed data, and comparing the at least one predetermined error to the at least one authentication key or component thereof. The method also includes the steps of authenticating the media and/or the data in the mixed data responsive to the comparing, removing the at least one predetermined error from the mixed data resulting in substantially the data, and outputting the data as at least one of audio, video, audio data, video data and digital data substantially free of the at least one predetermined error.

27 Claims, 25 Drawing Sheets

DISC
PLAYING TIME: 74 MINUTES, 33 SECONDS MAXIMUM
ROTATION: COUNTER-CLOCKWISE WHEN VIEWED FROM READOUT SURFACE
ROTATIONAL SPEED: 1.2-1.4 m/sec.
TRACK PITCH: 1.6 μm
DIAMETER: 120 mm
THICKNESS: 1.2 mm
CENTER HOLE DIAMETER: 15 mm
RECORDING AREA: 46 mm-117 mm
SIGNAL AREA: 50mm-116 mm
MATERIAL: ANY TRANSPARENT MATERIAL WITH 1.55 REFRACTION INDEX, SUCH AS POLYCARBONATE
MINIMUM PIT LENGTH: 0.833 μm (1.2 m/sec.) to 0.972 mm (1.4 m/sec.)
MAXIMUM PIT LENGTH: 3.05 μm (1.2 m/sec.) to 3.56 mm (1.4 m/sec.)
PIT DEPTH: APPROX. 0.11 μm
PIT WIDTH: APPROX. 0.5 μm OPTICAL SYSTEM
STANDARD WAVELENGTH: $\lambda$ = 780 nm (7.800A)
FOCAL DEPTH: ± 2 μm
($\lambda$/NA ≤ 1.75 μm, NA: NUMERICAL APERATURE)

SIGNAL FORMAT
NUMBER OF CHANNELS: 2 CHANNELS (4-CHANNEL RECORDING POSSIBLE)
QUANTIZATION: 16-BIT LINEAR QUANTIZATION
QUANTIZING TIMING: CONCURRENT FOR ALL CHANNELS
SAMPLING FREQUENCY: 44.1 kHz
CHANNEL BIT RATE: 4.3218 Mb/sec.
DATA BIT RATE: 2.0338 Mb/sec.
DATA-TO-CHANNEL BIT RATIO: 8:17
ERROR CORRECTION CODE: CIRC (WITH 25% REDUNDANCY)
MODULATION SYSTEM: EFM

FIG. 1
PRIOR ART

METHOD FOR MINIMIZING PIRATING AND/OR UNAUTHORIZED COPYING AND/OR UNAUTHORIZED ACCESS OF/TO DATA ON/FROM DATA MEDIA INCLUDING COMPACT DISCS AND DIGITAL VERSATILE DISCS, AND SYSTEM AND DATA MEDIA FOR SAME

RELATED APPLICATION

This application is a Continuation of U.S. patent application Ser. No. 09/315,012, filed May 20, 1999, now U.S. Pat. No. 6,684,199 and claims priority to U.S. Provisional Application No. 60/086,132, filed on May 20, 1998, which are incorporated herein by reference.

FIELD OF INVENTION

This invention relates generally to anti-data pirating technology. More specifically, the invention relates to a method and system for preventing piracy and/or unauthorized access and/or unauthorized copying of data, such as audio and/or video data from a data source, such as compact discs (CDs), digital versatile discs (DVDs), hard drive discs, an Internet Service Provider (ISP), and other data discs and/or data sources via direct connection, or via a local and/or global network, such as the Internet.

BACKGROUND OF THE INVENTION

Pohlmann, AThe Compact Disc@, THE COMPUTER MUSIC & DIGITAL AUDIO SERIES, Volume 5. The above-mentioned audio series, which was published by A-R Editions, Inc., in Madison, Wis., is, along with all volumes therein, incorporated by reference.

In analog recording, the recording medium (a tape) varies continuously according to the sound signal. In other words, an analog tape stores sound signals as a continuous stream of magnetism. The magnetism, which may have any value within a limited range, varies by the same amount as the sound signal voltage.

In digital recording, the sound signal is sampled electronically and recorded as a rapid sequence of separately coded measurements. In other words, a digital recording comprises rapid measurements of a sound signal in the form of on-off binary codes represented by ones and zeros. In this digital system, zeros are represented by indentations or pits in a disc surface, and ones are represented by unpitted surfaces or land reflections of the disc, such that a compact disc contains a spiral track of binary codes in the form of sequences of minute pits produced by a laser beam.

Music that is input to a digital recording and the requisite series of reproduction processes, must pass through the recording side of a pulse code modulation (PCM) system. A master recording of the music is stored in digital form on a magnetic tape or optical disc. Once the magnetic tape has been recorded, mixed and edited, it is ready for reproduction as a CD. The CD manufacturer then converts the master tape to a master disc, which is replicated to produce a desired number of CDs. At the end of the PCM system is the reproduction side, the CD player, which outputs the prerecorded music.

If digital technology is used in all intermediate steps between the recording and reproduction sides of the PCM system, music remains in binary code throughout the entire chain; music is converted to binary code when it enters the recording studio, and stays in binary code until it is converted back to analog form when it leaves the CD player and is audible to a listener. In most CD players, digital outputs therefrom preserve data in its original form until the data reaches the power amplifier, and the identical audio information recorded in the studio is thereby preserved on the disc.

Optical Storage

The physical specifications for a compact disc system are shown in Prior Art FIG. 1. They were developed jointly by Sony and Philips, and are defined in the standards document entitled Red Book, which is incorporated herein by reference. The CD standard is also contained in the International Electrotechnical Commission standard entitled, *Compact Disc Digital Audio System*, also incorporated herein by reference. Disc manufacturers, as well as CD player manufacturers, generally use these specifications.

All disc dimensions, including those pertaining to pit and physical formations, which encode data, are defined in the CD standard. For example, specifications information on sampling frequency, quantization word length, data rate, error correction code, and modulation scheme are all defined in the standard. Properties of the optical system that reads data from the disc using a leaser beam are also defined in the standard. Moreover, basic specifications relevant to CD player design are located in the signal format specifications.

Referring to Prior Art FIG. 2, the physical characteristics of the compact disc surface structure are described. Each CD is less than 5 inches in diameter whose track thickness is essentially thinner than a hair and whose track length averages approximately 3 and a half miles. The innermost portion of the disc is a hole, with a diameter of 15 mm, that does not hold data. The hole provides a clamping area for the CD player to hold the CD firmly to the spindle motor shaft.

Data is recorded on a surface area of the disc that is 35.5 mm wide. A lead-in area rings the innermost data area, and a lead-out area rings the outermost area. Both lead-in and lead-out areas contain non-audio data used to control the CD player. Generally, a change in appearance in the reflective data surface of a disc marks the end of musical information.

A transparent plastic substrate comprises most of the CD=s 1.2 mm thickness. Viewing a magnified portion of the CD surface, as shown in Prior Art FIG. 2, the top surface of the CD is covered with a very thin metal layer of generally aluminum, silver or gold. Data is physically contained in pits impressed along the CD=s top surface. Above this metalized pit surface and disc substrate, lies another thin protective lacquer coating (10 to 30 micrometers). An identifying label (5 micrometers) is printed on top of the lacquer coating.

A system of mirrors and lenses sends a beam of laser light to read the data. A laser beam is applied to the underside of a CD and passes through the transparent substrate and back again. The beam is focused on the metalized data surface that is sandwiched or embedded inside the disc. As the disc rotates, the laser beam moves across the disc from the center to the edge. This beam produces on-off code signals that are converted into, for example, a stereo electric signal.

The Pit Track

Prior Art FIG. 3 shows a typical compact disc pit surface. Each CD contains a track of pits arranged in a continuous spiral that runs from the inner circumference to the outer edge. The starting point begins at the inner circumference because, in some manufacturing processes, tracks at the outer diameter of a CD are more generally prone to manufacturing defects. Therefore, CDs with shorter playing time provide a greater manufacturing yield, which has led to adoption of smaller diameter discs (such as 8 cm CD-3 discs) or larger diameter discs (such as 20 and 30 cm CD-Video discs).

Prior Art FIG. 4 shows a diagram of a typical track pitch. The distance between successive tracks is 1.6 micrometers. That adds up to approximately 600 tracks per millimeter. There are 22,188 revolutions across a disc=s entire signal surface of 35.5 millimeters. Hence, a pit track may contain 3 billion pits. Because CDs are constructed in a diffraction-limited manner—creating the smallest formations of the wave nature of light—track pitch acts as a diffraction grating; namely, by producing a rainbow of colors. In fact, CD pits are among the smallest of all manufactured formations.

The linear dimensions of each track on a CD is the same, from the beginning of a spiral to the end. Consequently, each CD must rotate with constant linear velocity, a condition whereby uniform relative velocity is maintained between the CD and the pickup.

To accomplish this, the rotational speed of a CD varies depending on the position of the pickup. The disc rotates at a playing speed which varies from 500 revolutions per minute at the center, where the track starts, to 200 revolutions per minute at the edge. This difference in speed is accounted for by the number of tracks at each position.

For example, because each outer track revolution contains more pits than each inner track revolution, the CD must be slowed down as it plays in order to maintain a constant rate of data. So, when the pickup is reading the inner circumference of the CD, the disc rotates at the higher speed of 500 rpm. And as the pickup moves outwardly towards the disc=s edge, the rotational speed gradually decreases to 200 rpm. Thus, a constant linear velocity is maintained, such that all of the pits are read at the same speed. The CD player constantly reads from synchronization words from the data and adjusts the disc speed to keep the data rate constant.

A CD=s constant linear velocity (CLV) system is significantly different from an LP=s system. A major difference stems from the fact that a turntable=s motor rotates at a constant velocity rate of 33⅓ grooves. This translates into outer grooves having a greater apparent velocity than inner grooves, probably explained by the occurrence that high-frequency responses of inner grooves are inferior to that of outer grooves. If a CD used constant angular velocity (CAV) as opposed to the CLV system, pits on the outside diameter would have to be longer than pits on the inner diameter of the disc. This latter scenario would result in decreased data density and decreased playing time of a CD.

Like constant linear velocity, light beam modulation is also important to the optical read-out system that decodes the tracks. See Prior Art FIG. 5. A brief theoretical discussion on the distinctions between pit and land light travel explains this point.

Generally, when light passes from one medium to another with a different index of refraction, the light bends and its wavelength changes. The velocity at which light passes is important, because when velocity is slow, the beam bends and focusing occurs. Owing to several factors, such as the refractive index, disc thickness and laser lens aperture, the laser beam=s size on the disc surface is approximately 800 Φm. However, the laser beam is focused to approximately 1.7 Φm at the pit surface. In other words, the laser beam is focused to a point that is a little larger than a pit width. This condition minimizes the effects of dust or scratches on the CD=s outer surface, because the size of dust particles or scratches are effectively reduced along with the laser beam.

Any obstruction less than 0.5 ml are essentially insignificant and causes no error in the readout.

As previously noted, a CD=s entire pit surface is metalized. In addition, the reflective flat surface between each pit, (i.e. a land), causes almost 90 percent of laser light to be reflected back into the pickup. Looking at a spiral track from a laser=s perspective on the underside of a disc, as shown in Prior Art FIG. 5, pits appear as bumps. The height of each bump is generally between 0.11 and 0.13 Φm, such that this dimension is smaller than the laser beam=s wavelength (780 nanometers) in air. The dimension of the laser beam=s wavelength in air is larger than the laser=s wavelength (500 nanometers) inside the disc substrate, with a refractive index of 1.55. In short, the height of each bump is, therefore, one-quarter of the laser=s wavelength in the substrate.

Scientifically, this means that light striking a land will travel twice as far as light striking a bump. This discrepancy in light travel distance serve to modulate the intensity of a light beam. This allows data physically encoded on the disc to be recoverable by the laser.

Also, the pits and intervening reflective land on the disc=s surface do not directly designate ones and zeros. Rather, it is each pit=s edge, whether leading or trailing, that is a 1 and all areas in between, whether inside or outside a pit, that are designated as zeros. Still, each pit and reflective land lengths vary incrementally. The combinations of 9 different pit and land lengths of varying dimensions physically encode the data.

Error Correction

Error correction is one of the major advantages of digital audio storage media, such as compact discs, over analog media, like LPs. Error correction simply corrects the error.

When an LP is scratched, for instance, the grooves are irrevocably damaged, along with the information contained in them. On every replay of that record, there will be a click or pop when the damaged part of the groove passes beneath the needle.

This is not the case for CDs. The data on every disc is specially encoded with an error correction code. When a scratched CD is played, the CD player uses the error correction code to perform error correction every time the disc is played. Thus, it delivers the original undamaged data, instead of the damaged data.

Cross Interleave Reed-Solomon Code (CIRC)

As indicated above, error correction is essential to the success of digitized audio information. Otherwise, any digital recording, whether on tape or disc, would sound like a badly scratched LP.

The raw error rate from a CD is approximately $10^{-5}$ to $10^{-6}$; that is, about one error for ever 1 million bits. To put this in perspective, a disc will output over 4 million bits per second. So, while the raw error rate is impressive, the need for error correction is obvious.

With error correction, approximately 200 errors per second will be completely corrected. To achieve these results, each compact disc employs interleaving to distribute errors, and parity to correct them. Interleaving is the process of arranging data in time. Parity is a redundant error detection method in which the total number of binary ones (or zeros) is always even or odd. Interleaving and parity are the cornerstones of error correction.

The particular algorithm used for correcting errors in all compact disc systems is the Cross Interleave Reed-Solomon Code, (ACIRC@). In short, CIRC is a method of error detection and correction using data delay, rearrangement, and the Reed-Solomon coding algorithm. The CIRC circuit uses two correction codes for additional correcting capability, and three interleaving stages to encode data before it is placed on a disc. CIRC also performs error correction while decoding audio data during playback.

Reed-Solomon Codes:

The Reed-Solomon code used in CIRC is an error correcting code. It is particularly suited for the CD system because its decoding requirements are relatively simple. To detect errors in the received data, for example, two syndromes, or error patterns, are calculated using decoding equations. An error results in non-zero syndromes. Further, the value of erroneous words can be determined by the difference of the weighting in decoding equations.

Cross Interleaving:

As stated in its acronym, CIRC employs cross interleaving, which is the process of rearranging data in time. Cross interleaving permits more efficient correction of errors by decoders. This is accomplished by the separation of two error correction codes by an interleaving stage. Thus, one code can check the accuracy of the other code. Another important aspect about cross interleaving is that error correction is enhanced at the expense of redundancy; that is, the amount of redundancy is not increased.

CIRC Encoding:

The objective of this encoding algorithm is the cross-interleaving of bits from the audio signal, so that two encoding stages can generate parity symbols, or data values. Error correction encoding begins with the first stage of interleaving, which is designed to assist interpolation, an error concealment technique.

First, twenty-four 8-bit symbols are applied to the CIRC encoder. A delay of two symbols is placed between even and odd samples, such that even samples are delayed by two blocks, for instance. In the case where two uncorrectable blocks occur, standard interpolation techniques can be used. Interpolation is a method used to conceal errors by using adjacent data to determine the approximate value of missing/uncorrectable data.

Next, symbols are scrambled in order to separate even and odd numbered data words. This whole process facilitates concealment, a strategy used to supply approximate data in lieu of missing or incorrect data.

The next step involves the following symbols, which represent the following: (1) P and Q are parity values, which represent ones and zeros; and (2) C1 and C2 are correction encoders capable of correcting one and two symbols, respectively.

Proceeding with the process flow, a C2 encoder accepts a 24-byte parallel word and produces 4 bytes of Q parity. Q parity is designed to correct one erroneous symbol, or up to four erasures in one word, which comprises zeros and ones. An erasure is a word that has been erased by the decoders because detection has determined its value is unreliable.

Generally, the parity symbols are placed in the center of the CIRC encoding scheme block to increase the odd/even distance. This placement occurs because it enhances interpolation in the case of burst errors, which refers to a large number of data bits lost on a medium because of excessive damage to, or obstruction on, the medium.

After the Q parity symbol is generated by the C2 encoder, cross interleaving follows. The 28 bytes, (e. g., the 24 byte parallel word plus the 4-byte Q parity word), are delayed by different periods, which are integer multiples of four blocks. As a result of this convolutional interleave, each C2 word is stored in 28 different blocks and distributed over 109 blocks.

Next, a different encoder, C1, accepts the 28-byte word from 28 different C2 words, and produces 4 additional bytes of P parity. The C1 encoder is then used to correct single symbol errors. It is also used to detect and flag double and triple errors for Q correction.

The final interleave stage introduces a fixed odd/even delay of one symbol to alternate symbols. This delay spreads the output words/values over two data blocks, in effect, preventing random errors from disrupting more than one symbol in one word. Random errors are prevented even if two adjacent symbols in one block are erroneous.

Finally, the P and Q parity symbols generated by encoders C1 and C2, respectively, are inverted to provide non-zero P and Q symbols with zero data. The inversion process assists data readout during areas with muted audio program. At the end of the CIRC encoding process, which began with a 24 eight-bit symbols, 32 eight-bit symbols leave the CIRC encoder.

CIRC Decoding:

At playback, and following de-modulation, data is sent to a CIRC decoder for de-interleaving, error detection, and correction. Essentially, the CIRC decoding process reverses many of the processing steps accomplished during encoding. The CIRC decoding process employs parity from two Reed-Solomon decoders, and de-interleaving. Upon de-interleaving, for example, errors in consecutive bits or words are distributed to a wider area to guard against consecutive errors in the storage media.

The first decoder, C1, is designed to correct random errors and to detect burst errors, (i.e. data bits lost because of a damaged/obstructed medium). It puts a flag on all burst errors to alert the second decoder, C2. Given this prior knowledge, and help from de-interleaving, C2 can adequately correct burst errors, as well as random errors that C1 was unable to correct.

During reproduction of a digital recording to a CD, the CIRC decoder accepts one frame of thirty-two 8-bit symbols. Recall that this thirty-two 8-bit symbol is comprised of 24 bytes of audio data and 8 bytes of generated parity symbols. Odd numbered symbols are delayed, and parity symbols are inverted. Each delay line has a delay equal to the duration of a single symbol. Consequently, information of even numbered symbols of a frame is de-cross-interleaved with information of the odd numbered symbols on the next frame. The de-interleaving process serves to place even and odd numbered audio symbols back into their original order by essentially re-arranging the order as read from a disc. Any sequence of errors on the disc are distributed among valid data.

In the C1 decoder, errors are detected and corrected by the 4 bytes of P parity symbols previously generated by the C1 encoder. This includes correction for short duration random errors; longer burst errors are passed along. More specifically, the C1 decoder can correct a symbol error in every word/value of 32 symbols. If there is more than one erroneous symbol, then all 28 data symbols are marked with an erasure flag and passed on. Only valid symbols, which are those adhering to C1's encoding rules, are passed along unprocessed.

Delays between decoders C1 and C2 are of unequal length, and longer than the delays at the input to the C1 decoder. This interleaving enables the C2 decoder to correct longer burst errors. Moreover, because the word arriving at the C2 decoder contains symbols from the C1 decoder that is decoded at different times, those symbols that are marked with an erasure flag get distributed among valid symbols.

This situation helps the C2 decoder to correct burst errors. Symbols without an erasure flag are assumed error free and passed through unprocessed.

Contrary to the C1 decoder, where the P parity symbols are used to detect and correct errors, in the C2 decoder, errors are corrected by four Q parity symbols. If symbols are properly flagged, the C2 decoder can detect and correct single symbol errors; it can even correct up to four symbols. Burst errors arriving at C2 are also corrected, as are errors that might have occurred in the encoding process itself rather than in the medium.

Further, C2 can correct symbols that were incorrect by C1 decoding. In the event that the C2 decoder cannot accomplish correction because more than four symbols are flagged, 24 data symbols are flagged as uncorrected and passed on for interpolation, an error concealment technique. Final descrambling and delay is performed to assist with interpolation.

Using two correction decoders and cross interleaving helps tackle an otherwise particularly difficult error scenario. Interleaving distributes burst errors, sometimes caused by disc surface contamination, over different words for easier correction. This does not diminish the fact that correction is difficult when a burst error coincides with a random error introduced by a manufacturing defect, for example. However, since random errors are defined to be single symbol errors and any longer are burst errors, EFM (8-14 modulation) coding guarantees that a random error will never corrupt more than two symbols. The even/odd interleave guarantees that a 2-symbol random error will always appear as a single error in two different C1 words after de-interleaving. In short, this means that random errors are always correctable with the C2 decoder retaining its burst error correction capability.

CD Player Overview

The CD player contains two primary systems: an audio data processing system and a control system. Prior Art FIG. 6 depicts a block diagram of a CD player showing an audio path as well as servo and control functions. Generally, the data path, which directs modulated light from the pickup through a series of processing circuits, consists of several elements that ultimately produces a stereo analog signal. These elements of the data path include a data separator, buffer, de-interleaving RAM, error correction circuit, concealment circuit, oversampling filter, D/A converters, and output filters.

The servo and control system, in addition to a display system, directs the mechanical operation of the CD player, such as the player=s spindle drive, and the auto-tracking and auto-focusing functions. The servo, control and display system also directs the user interface to the CD player=s controls and displays.

A CD player uses a sophisticated optical read-out system to read data, control motor speed, track the pit spiral and adjust pickup positions and timings. While a spindle motor is used to rotate the disc with constant linear velocity, in another servo loop, information from the data itself determines correct rotating speed and data output rate.

User controls and their interface to the player=s circuitry is monitored by a microprocessor. A software program controls several modes of player operation. Subcode data is also used to direct the pickup to the proper disc location. For example, a time code is used to locate the start of any track.

Once data is recovered from the CD, the player must go through a series of activities to decode audio information in order to reconstruct an audio signal; namely, the EFM (eight-to-fourteen modulation) data is modulated, and errors are detected and corrected using an error correction algorithm. Additionally, using interpolation and muting, the audibility of gross errors is minimized.

Subsequent to decoding of the audio information, the digital data must be converted to a stereo analog signal. This conversion process requires one or two D/A converters and low-pass filters (in analog or digital domain).

An audio de-emphasis circuit exists in the audio output stages of every CD player. Some CDs are configured for improved signal-to-noise ratio. This configuration is accomplished by encoding the CD with an audio pre-emphasis flag in the subcode, where high frequencies on a master tape is slightly boosted (50/15 Φs characteristic). The result, on CD playback, is inverse attenuation of the disc=s high frequencies, because the player switches in the de-emphasis circuit when required, so that the signal-to-noise ratio is slightly improved.

The final output circuit is the buffer, which ensures that the CD player=s line level output is appropriate to drive necessary external amplifiers with a minimum amount of analog distortion.

Pickup Design

With respect to a player=s pickup design, a CD may contain as many as three billion pits, all orderly arranged on a spiral track. Each optical read-out system, which comprises an entire lens assembly and pickup, must focus, track and read data stored on a spiral track. The lens assembly, which is a combination of the laser beam and a reader, must be small enough to move across the underside of a disc in response to tracking information and user random-access programming. Moreover, movement of the pickup from a CD=s center to its edge must be focused despite adverse playing conditions, such as when a CD is dirty or vibrating.

Auto-Tracking

Unlike an LP, which has grooves to guide the pickup, a CD has a singular spiral pit track running from a center circle to its outer edge. The only object that touches the disc surface is an intensity-modulated laser light, which carries data and which is susceptible to obstructions, such as vibrations. Four standard methods have been designed for tracking pit spiral: (1) one-beam push-pull; (2) one-beam differential phase detection; (3) one-beam high frequency wobble; and (4) three-beam.

Auto-Focusing

The optical pickup must be precise in order to accommodate approximately 600,000 pits per second. Even the flattest disc is not perfectly flat; disc specifications acknowledge this by allowing for a vertical deflection of ∀600 Φm. In addition, a ∀2 Φm tolerance is required for the laser beam to stay focused, otherwise the phase interference between directed and reflected light is lost, along with audio data, tracking and focusing information. Therefore, the objective lens must be able to re-focus while the disc=s surface deviates vertically.

An auto-focus system, driven by a servo motor, manages this deviation, using control electronics and a servo motor to drive the objective lens. Three techniques are available for generating a focusing signal: (1) a cylindrical lens using astigmatism; (2) a knife edge using Foucault focusing; and (3) critical angle focusing.

Any pickup must perform both tracking and focusing functions simultaneously. Therefore, a completed pickup design would use a combination of the above-mentioned auto-tracking and auto-focusing techniques. Two standard pickup designs stand out from the rest when auto-tracking and auto-focusing functions are combined: (1) one-beam push-pull tracking with Foucault focusing, (hereinafter Aone-beam pickup@); and (2) three-beam tracking with astigmatic focusing, (hereinafter Athree-beam pickup@).

Both of these designs have been commercialized among manufacturers. One-beam pickups, which are usually mounted on a distal end of a pivoting arm, swings the pickup across a disc in an arc. On the other hand, three-beam pickups are mounted on a sled, which slides linearly across the disc.

The following exemplary prior art discussion will be limited to three-beam pickups only.

Three-Beam Pickup Optical Design

Prior Art FIG. 7 shows the optical path of a three-beam pickup, which uses a laser as the light source. A laser is used, rather than a bulb, for a number of reasons. First, a laser uses an optical resonator to stimulate atoms to a higher energy level that induces them to radiate in phase, a condition necessary to achieving sharper data surface focus and proper intensity modulation from the pit height.

Second, a laser light, unlike a bulb=s light, which radiates all the frequencies of a spectrum at all different phases, is composed of a single frequency and is coherent in phase. An important advantage of phase coherency is phase cancellation in the beam that is produced by disc pits, so that disc data can be read. Most CD pickups use an aluminum gallium arsenide semiconductor laser with a 0.5 milliwatt optical output that radiates a coherent-phase laser beam with a 780 nanometer wavelength, because the beam is comprised of near-infrared light.

Referring to Prior Art FIG. 7, a laser diode is positioned adjacent the focal point of a collimator lens with a long focal distance, for the purpose of making the divergent light rays parallel. A monitor diode (not shown) is also placed adjacent the laser diode in order to control power to the laser. The monitor diode stabilizes the laser=s output in two important ways; first, by compensating for temperature changes so as to prevent thermal runaway; and second, by conducting current in proportion to the light output of the laser.

The three-beam pickup is so termed because it uses three beams for tracking and reading a CD. To generate these beams, a laser light first passes through a diffraction grating, which resembles a screen with evenly-spaced slits of a few laser wavelengths apart. As the beam passes through the grating, the light diffracts into fringes of parallel light beams. When the collection of these beams is re-focused, the collection appears as a single, bright centered beam with a series of successively less intense beams on either side of the center beam.

It is this diffraction pattern that actually strikes the CD, where the center beam is used for both reading data and focusing. In a three-beam pickup, two of the series of successively less intense beams, or two secondary beams, are used for tracking only. In a one-beam pickup, data reading, focusing and tracking is accomplished with just one beam.

Another element in the three-beam optical design is the polarization beam splitter, or PBS, which consists of two prisms having a common 45 degree facing that acts as a polarizing prism. The purpose of the PBS is to direct the laser light to the disc, and to angle the reflected light (from the disc) to the photosensor. In some designs, a half-silvered mirror is used.

In Prior Art FIG. 7, the collimator lens is shown as following the PBS, even though it can precede the PBS in other designs. Once the light exits the collimator lens, it then passes through a quarter-wave plate (QWP). The QWP is an anisotropic material that exhibits properties with different values when measured in different directions, so that when light passes through the QWP, it rotates the plane of polarization of each passing light beam. This rotation is required to make the PBS work.

The anisotropic quality of the quarter-wave plate is equally important to the process occurring on the right-hand side of the plate. Light passing through the QWP to the CD, will be reflected from the CD back again through the QWP and become polarized. More importantly, the light is polarized in a plane at right angles to that of the incident light.

In other words, the reflected polarized light re-entering the quarter-wave plate (from right to left) will pass through the collimator and strike the polarization beam splitter. Because the polarization beam splitter passes light in one plane only (e.g., horizontally) but reflects light in the other plane (e.g., vertically), the PBS will properly deflect the reflected beam toward the photodiode sensor to read the digital data.

The final optics element in the path to the CD is the objective lens. The objective lens is used to focus laser beams into a convergent cone of light onto the CD=s data surface, taking into account the refractive index of the polycarbonate substrate of the disc. Convergence is a function of the numerical aperture (NA) of the lens, with most pickups using an objective lens having an NA of about 0.5.

As mentioned earlier, the laser beam=s size on the outer surface of the CD=s transparent polycarbonate substrate is approximately 800 micrometers in diameter. Since the refractive index of the substrate is 1.55 and its thickness is 1.2 millimeters, the laser beam=s size is narrowed to 1.7 micrometers at the reflective surface, a size slightly wider than the pit width of 0.5 micrometer and comparable in width to the light=s wavelength.

When the laser beam strikes a land, (the smooth surface between two pits), light is almost totally reflected. When the light strikes a pit (viewed as a bump by the laser), diffraction and destructive interference cause less light to be reflected.

In short, all three intensity-modulated light beams pass through the objective lens, the QWP, collimator lens, and the PBS. Before hitting the photodiode, they pass through a singlet lens and a cylindrical lens.

In any optical pickup system, automatic focusing is an absolute prerequisite. Disc warpage and other irregularities causes vertical deflections in the CD=s data surface. Such movement would place the data out of the pickup=s depth of focus, essentially making it impossible for the pickup to distinguish between pit height and land phase differences.

The unique properties of astigmatism are used to achieve auto-focusing in a three-beam CD player. This is illustrated in Prior Art FIG. 8.

The cylindrical lens, (see Prior Art FIG. 7), which prefaces the photodiode array, detects an out-of-focus condition. The condition is directly related to the distance between the objective lens and the CD=s reflective surface. As this distance varies, the focal point changes, and the image projected by the cylindrical lens changes its shape. The inter-relationship of the above elements is illustrated in Prior Art FIG. 8.

Changes in an image on the photodiode generates a focus correction signal. For example, when the distance between the objective lens and the CD decreases, the image projected by the lens moves further from the cylindrical lens, and the pattern becomes elliptical. Conversely, when the distance between the objective lens and the CD increases, the image projected by all lenses (e.g., the objective lens, an intermediate convex lens and the cylindrical lens) moves closer to the lens. However, the elliptical pattern that is formed is now rotated 90 degrees from the first elliptical pattern.

In the third and final scenario, which is when the disc surface lies exactly at the focal point of the objective lens, the image reflected through the intermediate convex lens and cylindrical lens is unchanged, and a circular spot strikes the center of the photodiode.

An important aspect of the three-beam auto-focus system is correction voltages. A photodiode uses a laser beam=s intensity level to generate a focus correction voltage, which in turn generates a control signal. These electrical signals control the mechanical motion of a servo motor, which is responsible for moving the objective lens along an optical axis in response to any vertical disc motion. Servo-controlled movement of the objective lens during disc motion results in automatic focusing.

Prior Art FIG. 9 illustrates a typical servo motor used to move the objective lens in the optical path. The servo motor consists of a coil and magnet structure generally used in loudspeakers.

Operation of a CD player begins when a CD is first loaded into the player. Technically, an electrical control signal is sent into the optical pickup system, which causes the laser to turn on, and the objective lens to move vertically until a focus condition is reached.

Then, the auto-focusing system takes over, except if two negative situations occur. If no CD is detected, the automatic focusing system tries again, and cuts off if it fails to detect a CD again. If the auto-focus is inoperative, such as when the CD tray is open, the system pulls back the objective lens to prevent damage to the lens or CD. Otherwise, the automatic focusing system performs its operation smoothly by keeping the pickup properly positioned beneath the spinning disc, in effect maintaining focus to within a tolerance of approximately ∀0.5 micrometers.

Content Scrambling System

Currently, encryption for data media, such as DVDs, involves one key. It is a fairly simple 40-bit scheme. There is good authentication of the platform, which is performed by various key exchanges within the mechanisms between the source drive and the actual platform decrypting the data.

A content scrambling system (CSS) is included in every DVD player. CSS is a method of encrypting a disc that the information technology (IT) and motion picture industries agreed upon. In order to be licensed to manufacture DVD players, a company is required to obey certain rules pertaining to the uses (and non-uses) that a platform can perform, as part of a license agreement.

While the present invention is not required to incorporate the CSS encryption system, it could be one level of encryption, if a multi-level encryption is employed. Audio information is generally encrypted prior to being burned into a disc, such as a CD. Hence, there is no plain text; encrypted information only is contained on a CD. So, if a user seeks to access information contained on the CD, whether for listening or copying purposes, the user would have to decrypt the data in order to hear sensible audio data.

In general, existing ideas in the field appear to bury authentication keys within encrypted information that is burned into the disc. Authentication keys are buried using various authentication processes, which verify that the platform device—whether a computer, CD player, DVD player, or the like—is a licensed device and, consequently, obeys certain copyright rules. Eventually, the licensed device uncovers the buried authentication key(s) and decrypts the data contained on the disc. So, the system needs to find the key before being eligible for decrypting the audio data.

The following prior patents represent the state of the art of preventing unauthorized copying of data, and are all hereby incorporated by reference:

U.S. Pat. No. 4,811,325 to Sharples, Jr. et al. discloses a high speed copying of audio programs on optical CDs. The master CD is encoded using Adaptive Delta Modulation (ADM).

U.S. Pat. No. 4,879,704 to Takagi et al. prevents copying of an optical disc. Data is stored in a record protected area and in a record unprotected area, where each such sector has a representative address that helps to determine whether the data is in the record protected area or in the record unprotected area. Only data from the record unprotected area with an appropriate address can be copied.

U.S. Pat. No. 4,937,679 to Ryan discloses a video recording and copy prevention system. The video signal includes a copy-protect signal. Designated detectors detect the presence of copy-protected signal(s) and inhibit copying of such signals. A video correlate enables one to playback a copy-protected program for viewing only and generates an inhibit signal to prevent copying of a copy-protected signal.

In U.S. Pat. No. 4,975,898 to Yoshida, an erasing program erases the non-rewritable portion so that it cannot be copied on a copy disc during unauthorized copying of an optical disc.

U.S. Pat. No. 5,319,735 to Preuss et al. uses a digital code signal embedded with the original audio signal. The digital code gets transferred to the copy disc.

In U.S. Pat. No. 5,412,718 to Narasimhalu et al., non-uniformities and their attributes in the storage medium is used as a unique signature. This signature is used to derive a key for encrypting the information on the storage medium. During copying, the signature gets mutated and the information cannot be decrypted. During authorized copying, the information is decrypted by generating a key from the signature of the distribution medium.

In U.S. Pat. No. 5,418,852 to Itami et al., data is stored in a user accessible area and in a user inaccessible area, which are both compared to determine the authenticity of the recording medium.

In U.S. Pat. No. 5,513,260 to Ryan, copy-protected CDs have authenticating signature recorded on them. An authentication signature is obtained by a deliberately induced radial position modulation giving an error voltage corresponding to the elliptical errors. When playing the CD, the signature causes the player to correctly decrypt the program whereas, when playing an unauthorized copy of the CD, the absence of the signature is detected and false data is generated and the player does not play.

U.S. Pat. No. 5,538,773 to Kondo discloses the recording of data together with a cipher key information for copy protection.

U.S. Pat. No. 5,570,339 to Nagano discloses a system that converts data to digital data, which is then FM modulated with key information to vary the widths of the pits at the time of recording. During reproduction, the data is read out and if the key information is determined to be missing, copying is prevented.

U.S. Pat. No. 5,608,717 to Ito et al. discloses a CD-ROM that has a character/graphic pattern for copy protection. Password and information on the position of the character/graphic pattern bearing area of the CD-ROM are stored beforehand in a memory included in the CD-ROM=s controller of the playback system. The CD-ROM controller, therefore, will have the means for deciphering the enciphered password. Data are modulated by the EFM modulation method into bits of predetermined width and height having values corresponding to the EFM.

U.S. Pat. No. 5,608,718 to Schiewe discloses an optical disc having shallow pits bearing an identification/logo/ watermark. The lands and pits are of different lengths for identification/authorization purposes when copying a CD.

U.S. Pat. No. 5,636,276 to Brugger discloses the distribution of digital music with copyright protection. An encryption table is embedded in the music CD player and includes a decryption module that uses the encryption table for authorized playing of music/information.

U.S. Pat. No. 5,636,281 to Antonini discloses an authorized access that uses mingling of data elements of the program memory to be protected according to a secret order. To use this memory, a transconding device is used. The transconding device is in the form of a memory containing several tables, only one of which gives the right transconding data elements.

The problem with one or more of the above-mentioned conventional encryption/decryption system is that a pirate or hacker seeking to hack into the encryption process on a disc could do so by playing the encrypted music, finding the decryption key, which is buried, mixed and interleaved with the audio data or the encrypted audio data, and using that key to decrypt the audio on the disc.

In other words, accompaniment of the decryption key within the audio data lends itself to discovery, even if the audio data is played in an encrypted form. A hacker could obtain decryption key(s) even if the encrypted audio data was placed onto an unlicensed computer platform having a DVD ROM drive that did not obey copyright protection rules, because if the audio is later played back, the key would be output along with the encrypted audio data.

An additional problem in one or more of the prior art references is that keys specific to, or derived from, the physical construction of the CD are not constructed or determined in a manner that is difficult to detect by a hacker. A further problem in the prior art is that the physical characteristics of the CD which are used to derive a key for authorized copying, are transferred in the audio and may be accessible to the hacker.

Yet another problem in one or more of the prior art references is that the solutions proposed therein require significant additional hardware and/or software to be implemented. That is, these prior art techniques do not take advantage of existing hardware/software within the CD or DVD player that can be used effectively to prevent unauthorized copying.

Yet another problem in one or more of the prior art references is that the solutions proposed therein are expensive, and incompatible with existing CD or DVD players. Hence, current solutions to unauthorized copying are difficult and impractical in their implementation.

Yet another problem in one or more of the prior art references is that the solutions proposed therein are limited to CD and/or DVD players, and does not consider or structure such techniques when data is transmitted from, to, and/or, or over local and/ore global networks, such as the Internet.

SUMMARY OF THE INVENTION

It is a feature and advantage of the present invention to provide a method and/or apparatus for minimizing pirating of, or unauthorized access to, data on a data media that is inexpensive, and compatible with existing CD and/or DVD players, and other forms of data recording and/or playing devices.

It is another feature and advantage of the present invention to provide a method and/or apparatus for minimizing pirating of, or unauthorized access to, data on a data media that is manageable and practical in its implementation.

It is another feature and advantage of the present invention to provide a method and/or apparatus for minimizing pirating of, or unauthorized access to, data on a data media that does not require significant additional hardware and/or software in its implementation.

It is another feature and advantage of the present invention to provide a method and/or apparatus for minimizing pirating of, or unauthorized access to, data on a data media that uses and/or adapts existing hardware/software within, for example, the CD or DVD player, that can be used effectively to prevent unauthorized copying.

It is another feature and advantage of the present invention to provide a method and/or apparatus for minimizing pirating of, or unauthorized access to, data on a data media that uses or creates data keys specific to, or derived from, the physical construction of the CD in a manner which is difficult to detect by a hacker.

It is another feature and advantage of the present invention to provide a method and/or apparatus for minimizing pirating of, or unauthorized access to, data on a data media that uses the physical characteristics of the CD to derive a key for authorized copying, and which key is prevented from being transferred in the audio and, therefore, not accessible to the hacker.

The present invention relates to a method/system of preventing unauthorized copying of data on data media, including CDs and DVDs. Generally, an authorized CD is designed to require decoding by an authorized disc player. The authorized CD includes certain information used by an authorized CD player for playing music. An unauthorized copied CD, however, does not have the requisite encryption/decryption key(s) necessary for decoding.

Consequently, a feature and advantage of present invention is to prevent piracy of audio and/or video data from discs; that is, to provide greatly enhanced security measures against CD pirating. The present invention is based, in part, on my discovery that the authorization key(s) need not necessarily be transferred in the audio using conventional hardware and/or software in CD or DVD players that may be adapted in one or more ways described below.

The above features and advantages are accomplished generally by intentionally embedding, in the data, predetermined errors that are used as a decryption key, and using, for example, a Reed-Solomon decoder to remove the predetermined errors/decryption key(s) from the audio data in a natural manner.

Singular or multi-level decryption systems may be used for preventing unauthorized copying of audio data on a disc. Similarly, two or three different decryption systems, each of which successively must be decrypted before the audio is finally available, may also be used.

Advantageously, the present invention optionally uses three or four different sources for making or compiling a long or compound keys. Thus, in other words, instead of having a multi-layered decryption or authorization system, the present invention optionally includes a multi-level decryption key, each component of which must be found in order to build the whole key to perform the entire decryption or authorization process.

According to the present invention, the standard Reed-Solomon decoding method, for example, is used to remove the predetermined errors that are intentionally embedded on an original authorized CD from the audio. Thus, the predetermined errors are prevented from being transferred in the audio output from the CD player or DVD player, and the like. The predetermined errors are configured as an authorization and/or decryption key(s) or a component thereof.

Advantageously, the predetermined errors are corrected before the audio information is output via, for example, a conventional Reed-Solomon decoder, which is present in all CD players. Upon playback, the Reed-Solomon decoder, in correcting the predetermined errors, also automatically removes, from the audio, the key(s) or code(s), or components thereof appearing as predetermined errors, intentionally embedded in the audio data.

Accordingly, the audio data contained on this particular CD is stripped of all necessary keys required for subsequent playback on another CD player or recorder. Thus, because predetermined errors have already been removed by the Reed-Solomon decoder, the second CD player/recorder, if positioned to intercept the audio, does not receive any predetermined errors (or the authorization and/or decryption keys/codes), and therefore, cannot play the data thereon. The second CD player/recorder cannot also record the audio data onto an unauthorized CD with the keys that have been previously filtered. Therefore, the present invention also prevents the manufacture and/or distribution of pirated CDs.

A further advantage of the present invention is that the predetermined errors are optionally embedded in the data disc on a per track basis, or at intervals throughout the disc. This means that the same type of authorization process may be performed for each track to be played, or may be performed throughout the playing/recording process. Thus, it is important to note that each track of a CD can optionally include a different authorization or decryption key.

To achieve these and other objects, the present invention provides a computer program product that stores computer instructions thereon for instructing a computer to perform a process of authenticating a data media, such as a CD or DVD, as fraudulent/pirated or non-fraudulent.

In accordance with one embodiment of the invention, a method authenticates at least one of a media and data stored on said media in order to prevent at least one of piracy, unauthorized access and unauthorized copying of the data stored on said media. At least one predetermined error is introduced with the data resulting in mixed data. The mixed data is optionally stored on the media. The at least one predetermined error includes at least one authentication key or component thereof, for authenticating whether the media and/or data is authorized. The method includes the following sequential, non-sequential and/or sequence independent steps: reading the mixed data from the media, detecting the at least one predetermined error from the mixed data, and comparing the at least one predetermined error to the at least one authentication key or component thereof. The method also includes the steps of authenticating the media and/or the data in the mixed data responsive to the comparing, removing the at least one predetermined error from the mixed data resulting in substantially the data, and outputting the data as at least one of audio, video, audio data, video data and digital data substantially free of the at least one predetermined error.

In accordance with another embodiment of the invention, a data player includes a data processor reading mixed data including data and at least one predetermined error from a media, detecting at least one predetermined error from the mixed data, and comparing the predetermined error to at least one authentication key or component thereof. The data player authenticates the media and/or the data in the mixed data responsive to the comparing, and removes the predetermined error from the mixed data resulting in substantially the original data. The data player outputs the data as at least one of audio, video, audio data, video data and digital data substantially free of the predetermined error.

According to another embodiment of the invention, a data message comprises at least one predetermined error introduced in the data message comprising a mixed data message. The at least one predetermined error comprises at least one authentication key or component thereof, used in authenticating whether the data message is authorized. The predetermined errors are sufficiently minimal such that the at least one predetermined error is capable of being removed therefrom without substantially altering an audible component of the data message. The data message is advantageously transmitted substantially free of the at least one predetermined error preventing a destination processor from the at least one predetermined error comprising the at least one authentication key or component thereof, used in the authenticating whether the data message is authorized.

According to another embodiment of the invention, a data disk comprises at least one predetermined error introduced in the data disk with the data as mixed data. The mixed data is stored on the data disk. The at least one predetermined error includes at least one authentication key or component thereof, used in authenticating whether the at least one of said data disk and data is authorized.

A computer or processor driven system, tangible medium including instructions thereon, and process is also provided.

There has thus been outlined, rather broadly, the important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be used as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially scientists, engineers and practitioners in the art, who are not familiar with patent or legal terms or phraseology, to determine quickly from a cursory inspection, the nature and essence of the technical disclosure of the application. The abstract is neither intended to define the invention of the application, which is measured by the claims, nor is it intended to be limiting as to the scope of the invention in any way.

The above objects of the invention, together with other apparent objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter, which illustrates preferred embodiments of the invention.

BRIEF DESCRIPTION OF THE DRAWINGS

FIG. 1 shows a conventional specification table for a conventional compact disc system.

The same reference numerals refer to the same parts through the various figures.

NOTATIONS AND NOMENCLATURES

Figure 2:
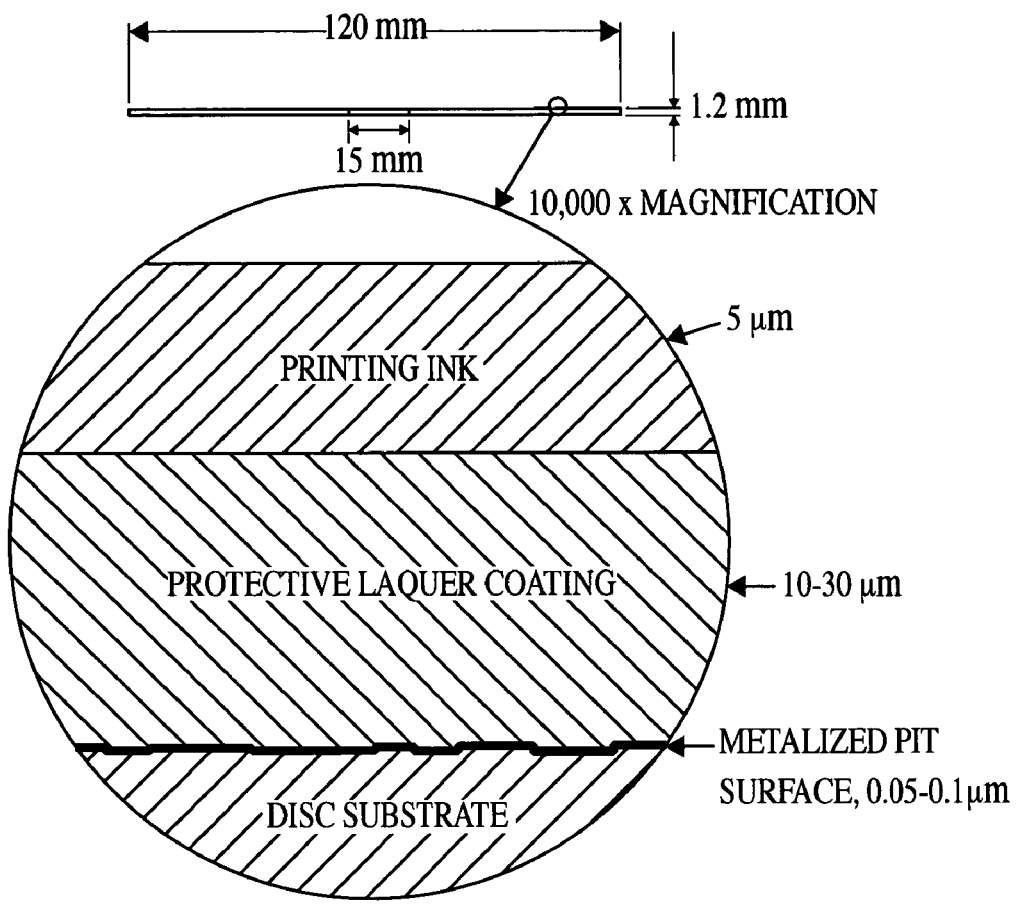
FIG. 2 shows a scale drawing of a conventional CD data surface.
Figure 3:
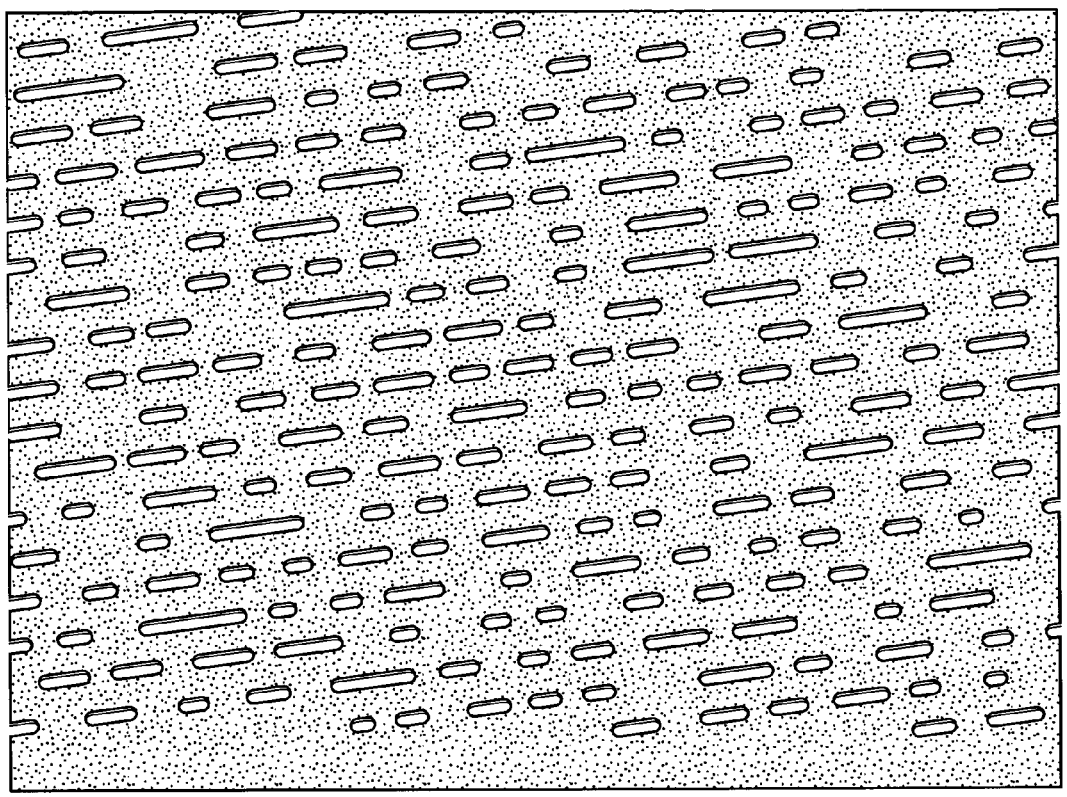
FIG. 3 shows a typical compact disc pit surface.
Figure 4:
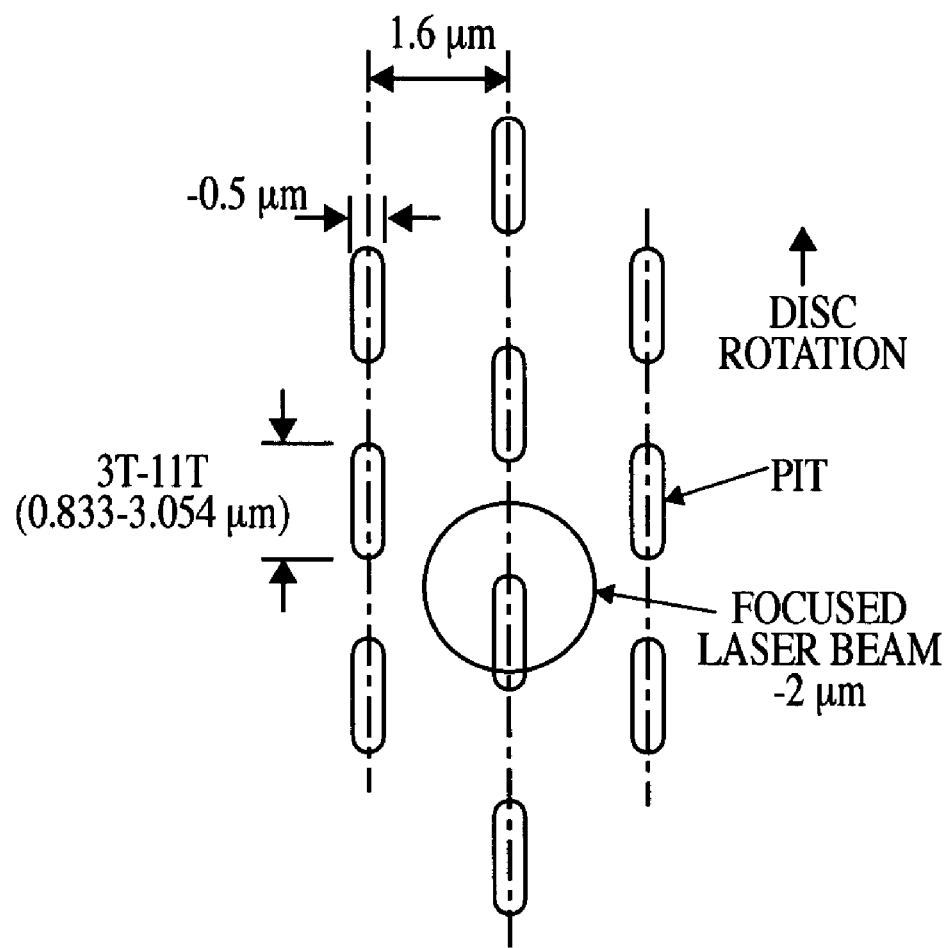
FIG. 4 shows a diagram of a conventional pit track.
Figure 5:
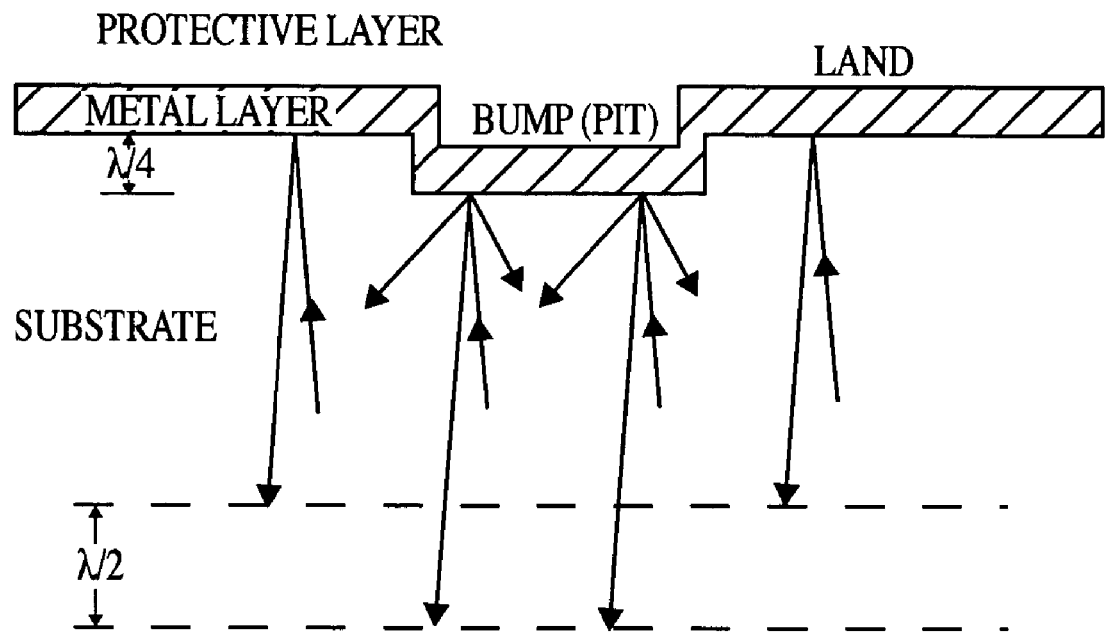
FIG. 5 shows a conventional bump height on a CD surface.
Figure 6:
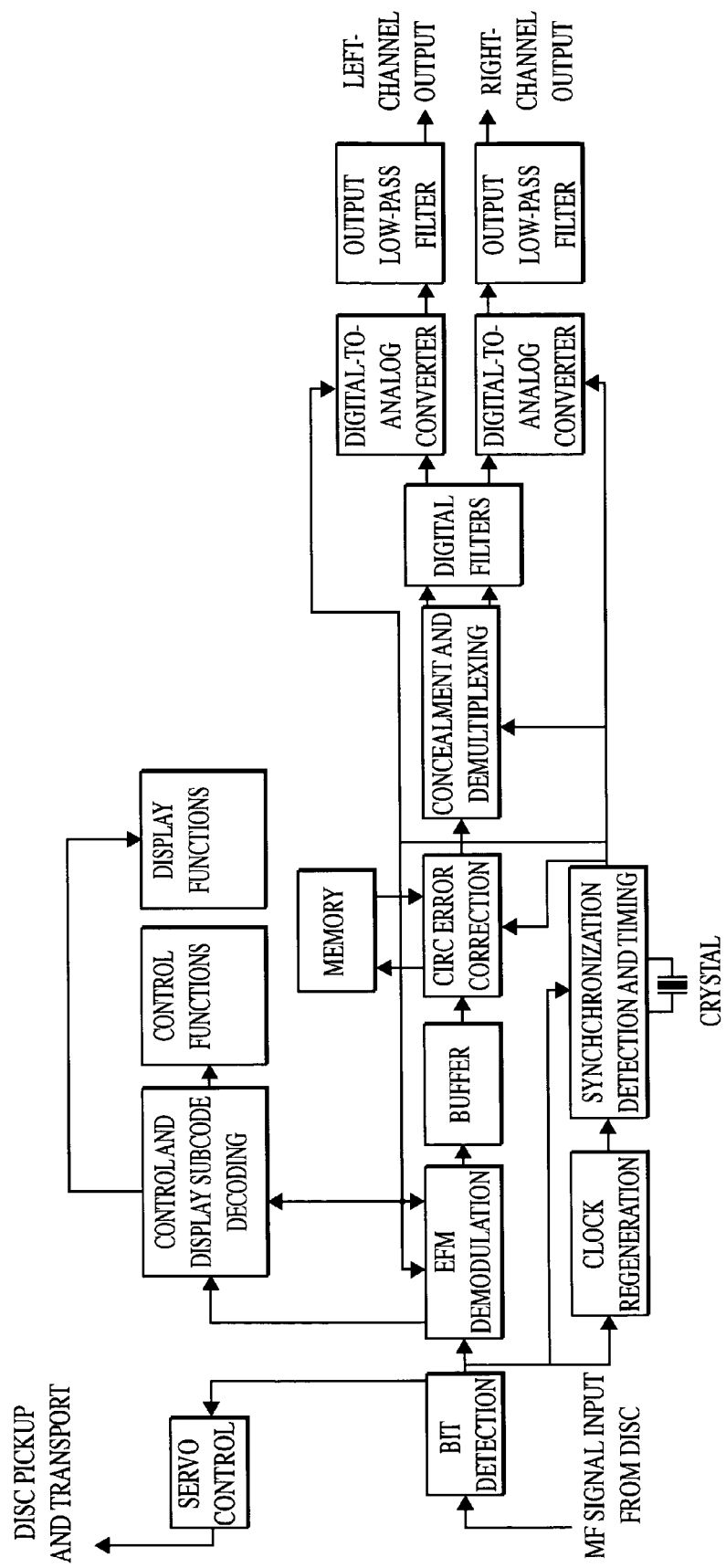
FIG. 6 shows a block diagram of a conventional CD player showing audio path as well as servo and control functions.
Figure 7:
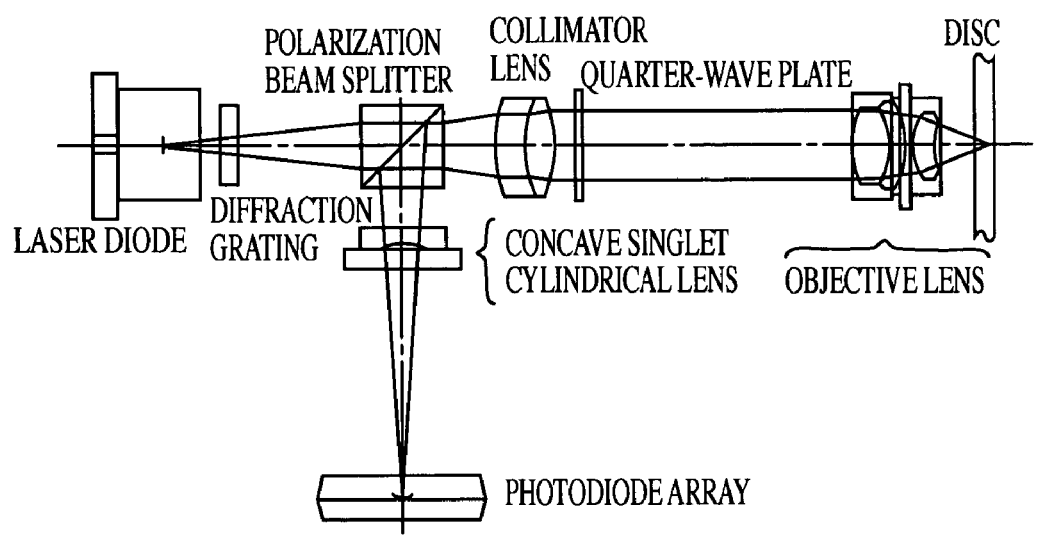
FIG. 7 shows an optical path of a conventional three-beam pickup system.
Figure 8:
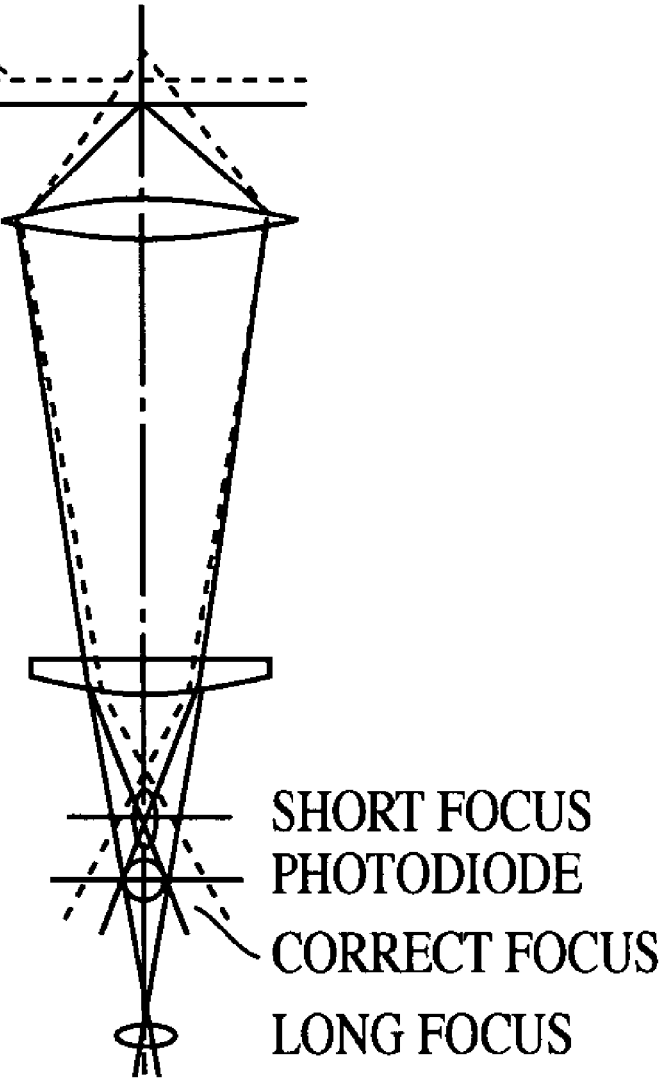
FIG. 8 shows the properties of astigmatism used to generate an auto-focus correction signal in a conventional three-beam pickup system.
Figure 9:
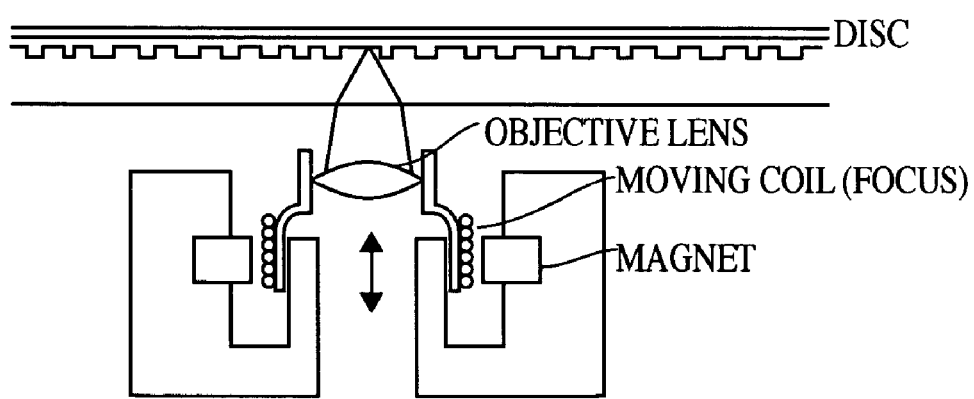
FIG. 9 shows a conventional servo motor used to move the objective lens in an optical path.

The detailed description that follows may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though no necessarily, these quantities take the form of electrical or magnetic signals capable of being stored, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in a computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

DETAILED DESCRIPTION OF THE PREFERRED EMBODIMENTS

The present invention relates to a method/system of preventing unauthorized copying of data on data media, including CDs and DVDs. Generally, an authorized CD is designed to require decoding by an authorized disc player. The authorized CD includes certain information used by an authorized CD player for playing music. An unauthorized copied, formed or pressed CD, however, does not have the requisite encryption/decryption key(s) necessary for decoding.

Consequently, a feature and advantage of present invention is to prevent piracy of audio and/or video data from discs; that is, to provide greatly enhanced security measures against CD pirating. The present invention is based, in part, on my discovery that the authorization key(s) need not necessarily be transferred in the audio using conventional hardware and/or software in CD or DVD players that may be adapted in one or more ways described below.

In the present invention, predetermined errors are intentionally embedded, in the data, and are used as a decryption key. A Reed-Solomon decoder is used to remove the predetermined errors/decryption key(s) from the audio data in a natural manner. Singular or multi-level decryption systems may be used for preventing unauthorized copying of audio data or other data on a disc. Similarly, two or three different decryption systems, each of which successively must be decrypted before the audio is finally available, may also be used.

Advantageously, the present invention optionally uses three or four different sources for making or compiling a long or compound keys. Thus, in other words, instead of, or in addition to, having a multi-layered decryption or authorization system, the present invention optionally includes a multi-level decryption key, each component of which must be found in order to build the whole key to perform the entire decryption or authorization process.

According to the present invention, the standard Reed-Solomon decoding method or other acceptable method, for example, is used to remove the predetermined errors that are intentionally embedded on an original authorized CD from the audio. Thus, the predetermined errors are prevented from being transferred in the audio output from the CD player or DVD player, and the like. The predetermined errors are configured as an authorization and/or decryption key(s) or a component thereof.

Advantageously, the predetermined errors are corrected before the audio information is output via, for example, a conventional Reed-Solomon decoder, which is present in all CD players. Upon playback, the Reed-Solomon decoder, in correcting the predetermined errors, also automatically removes, from the audio, the key(s) or code(s), or components thereof appearing as predetermined errors, intentionally embedded in the audio data.

Accordingly, the audio data contained on this particular CD is stripped of all necessary keys required for subsequent playback on another CD player or recorder. Thus, because predetermined errors have already been removed by the Reed-Solomon decoder from the output data, the second CD player/recorder, if positioned to intercept the audio or other data output, does not receive any predetermined errors (or the authorization and/or decryption keys/codes), and therefore, cannot play the data thereon. The second CD player/recorder cannot also record the audio data onto an unauthorized CD with the keys that have been previously filtered. Therefore, the present invention also prevents the manufacture and/or distribution of pirated CDs.

A further advantage of the present invention is that the predetermined errors are optionally embedded in the data disc on a per track basis, or at intervals throughout the disc. This means that the same type of authorization process may be performed for each track to be played, or may be performed throughout the playing/recording process. Thus, it is important to note that each track of a CD can optionally include a different authorization or decryption key.

Figure 10:
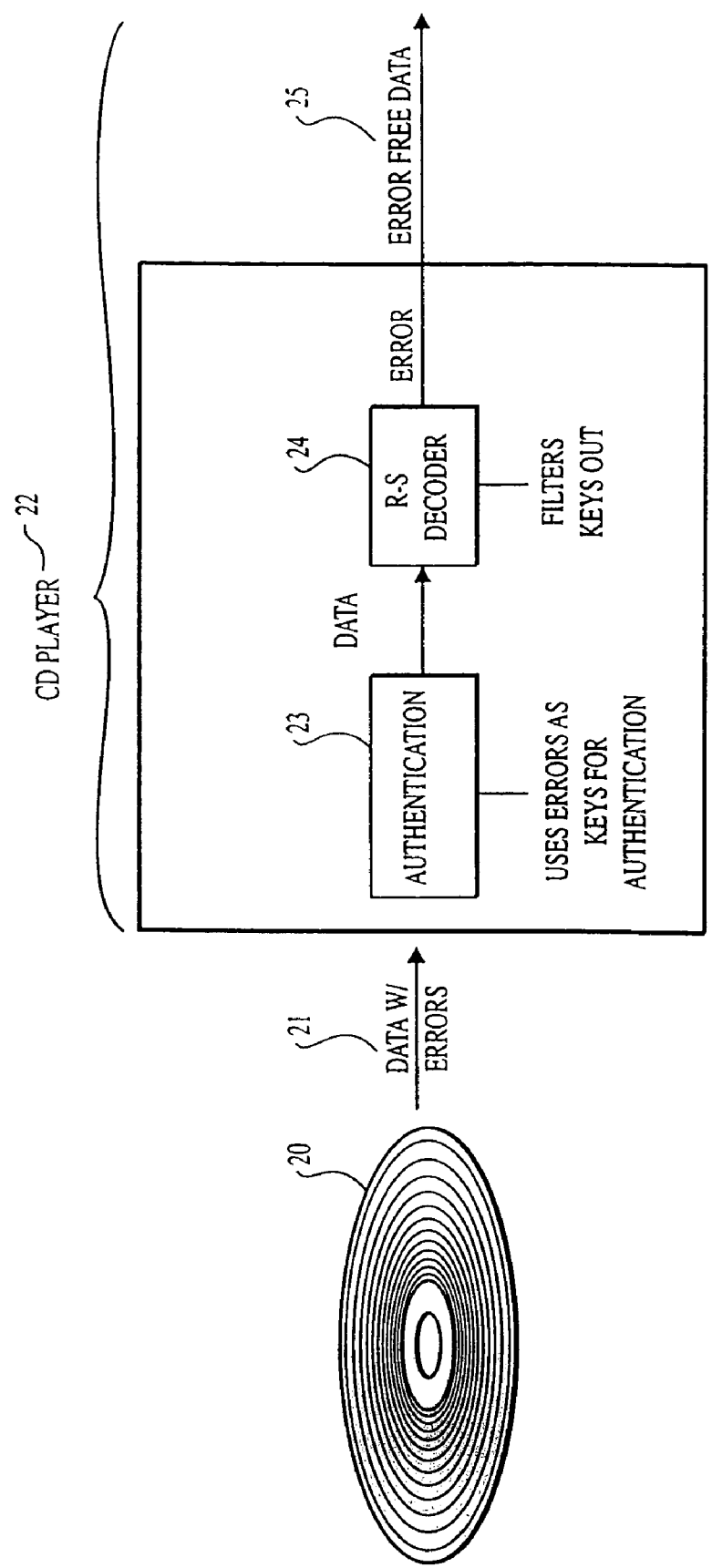
FIG. 10 shows a Reed-Solomon decoder of the present invention.

FIG. 10 is a high-level block diagram of one embodiment of the method/system of the present invention. The method generally consists of the step of introducing data containing errors, which is stored on a media, to a Reed-Solomon decoder, as at 10. The data containing errors may be referred to as predetermined errors. At step 10, predetermined errors are introduced into the Reed-Solomon decoder at a low error rate, optionally at a predetermined rate, that facilitates easy correction by the decoder.

At the next step, as at 11, the decoder uses conventional decoder flags, such as the standard C1 flag output from the decoder, to filter or remove predetermined errors from the data. These errors are removed from the data without destroying the original data since the errors are small or insignificant enough to not affect, for example, the audio data broadcast for the human ear. Moreover, predetermined errors are removed from the encrypted data as well. That is, the error removal step applies equally well to data that is in plain text or in encrypted form, because the rules for removing errors are independent of the form of the data. Error corrector, or decoder, flags like C1 do not know whether the data being handled is audio or video, or whether the data is encrypted.

Finally, after error removal, as at 12, data without the predetermined errors are output from the R-S decoder.

Figure 11:
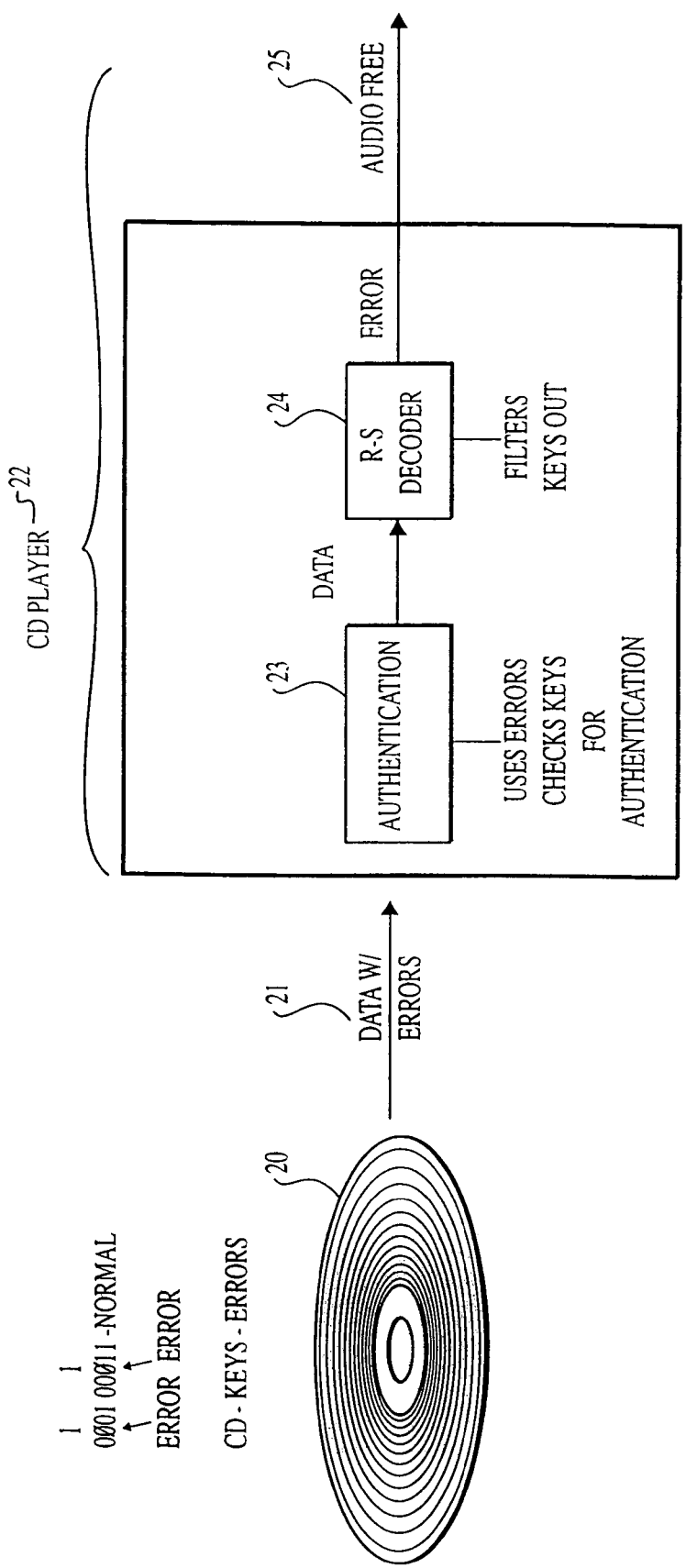
FIG. 11 shows a block diagram of the process by which predetermined errors are intentionally embedded in data to be stored on a disc, and are used as a key or keys for authenticating a disc.

FIG. 11 outlines a more detailed embodiment of the above method in more detail. FIG. 11 illustrates a block diagram of the process by which predetermined errors are intentionally embedded in data stored on a disc and are used as an authorization key or keys for authenticating the existence of a non-pirated disc. The process begins with a data media, which may be a data disc or storage, a computer storage or a network of computers having storage capacity, such as the Internet, capable of storing data.

In this embodiment, the data media is a CD 20 onto which predetermined errors are intentionally embedded. Predetermined errors, in a digital recording, are normal on-off binary codes represented by ones and zeros in which normal binary codes are intentionally altered to represent errors. Of course, other data formats, including standard data formats, also apply in or to the present invention. For example, a normal binary code represented by >0001' may be configured as an error represented by >0101'. Similarly, the binary code >00011' may be changed to >00111'. These errors are mixed and edited with the original data before being burned into a master disc, which is replicated to produce a desired number of CDs.

The resulting data 21 containing predetermined errors is introduced into an authentication module 23 when disc 20 is inserted into a CD player 22 of the present invention. Authentication module 23 is generally disposed within CD player 22, although it may optionally be located remote from the actual player device or box. CD player 22 uses the predetermined errors in data 21 as keys for authenticating whether CD 20 is a non-pirated disc. Once CD 20 is authenticated, authentication module 23 transfers data 21 to R-S decoder 24 or other standard decoder, which intakes the data, rearranges it, compiles it into a table, performs error correction, and outputs the corrected data 25. The newly corrected data 25 output from the CD player 22 is free of predetermined errors and contains the original (audio) data only.

Figure 12:
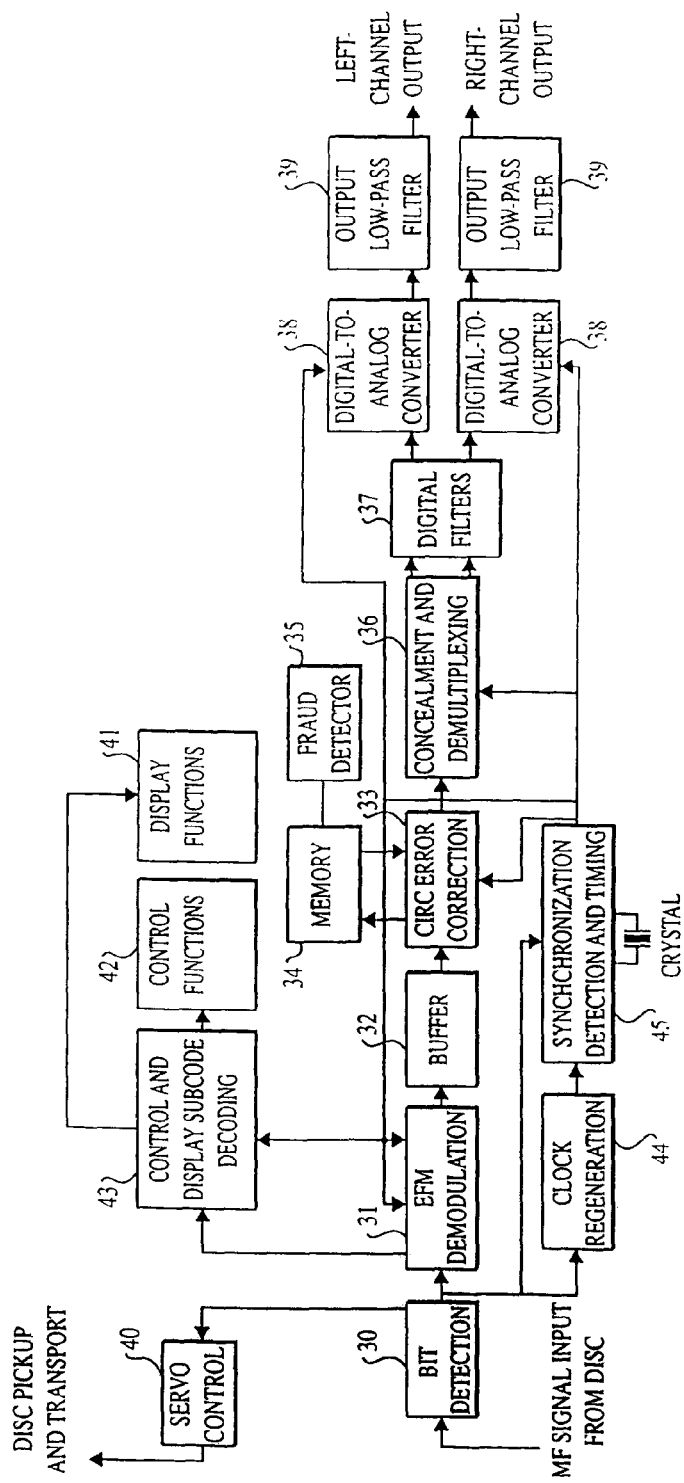
FIG. 12 shows a block diagram of a CD player of the present invention, which includes a fraud detector.

As described in FIG. 12, the CD player 22 of the present invention includes a fraud detector 35. Upon playback, disc player 22 begins reading CD 20 by detecting bits, as at 30. Once data 21 is recovered from disc 20, it must be demodulated, as at 31; that is, player 22 must go through a series of activities to decode audio information in order to reconstruct an audio signal.

The other elements of the audio data path whose interaction ultimately produces a stereo analog signal include buffer 32, an error correction circuit, as at 33, de-interleaving RAM 34 to which fraud detector 35 is connected, concealment and demultiplexing circuit 36, and digital filters 37. Authentication module 23 is included in fraud detector 35. The process of converting the digital data to a stereo analog signal requires one or two digital-to-analog converters 38 and low-pass filters 39.

The servo control system 40 along with a display system, as at 41, work together in controlling the mechanical operation of the CD player 22. These operations include the player=s spindle drive as well as auto-tracking and auto-focusing functions. Both systems 40, 41 also directs the user interface to the CD player=s controls 42 and displays.

A microprocessor (not shown) monitors user controls and their interface to the player=s circuitry, which includes subcode data decoding, as at 43. Subcode data plays an important role in directing the pickup to the proper disc location. Moreover, the various elements of CD player 22 shown in FIG. 12 are closely inter-related in a timing relationship, as at 43 and 44, that determines correct rotating speed and data output rate, for example.

All of the above components illustrated in FIG. 12 generally comprise standard components in CD players, with the exception of the fraud detector module 35. The fraud detector module 35 comprises either a separate data processor, such as a standard microprocessor, that performs the functions described herein. Alternatively, fraud detector module 35 may advantageously be implemented on the existing processing hardware currently existing in CD players. herein. Alternatively, fraud detector module 35 may advantageously be implemented on the existing processing hardware currently existing in CD players.

Figure 13:
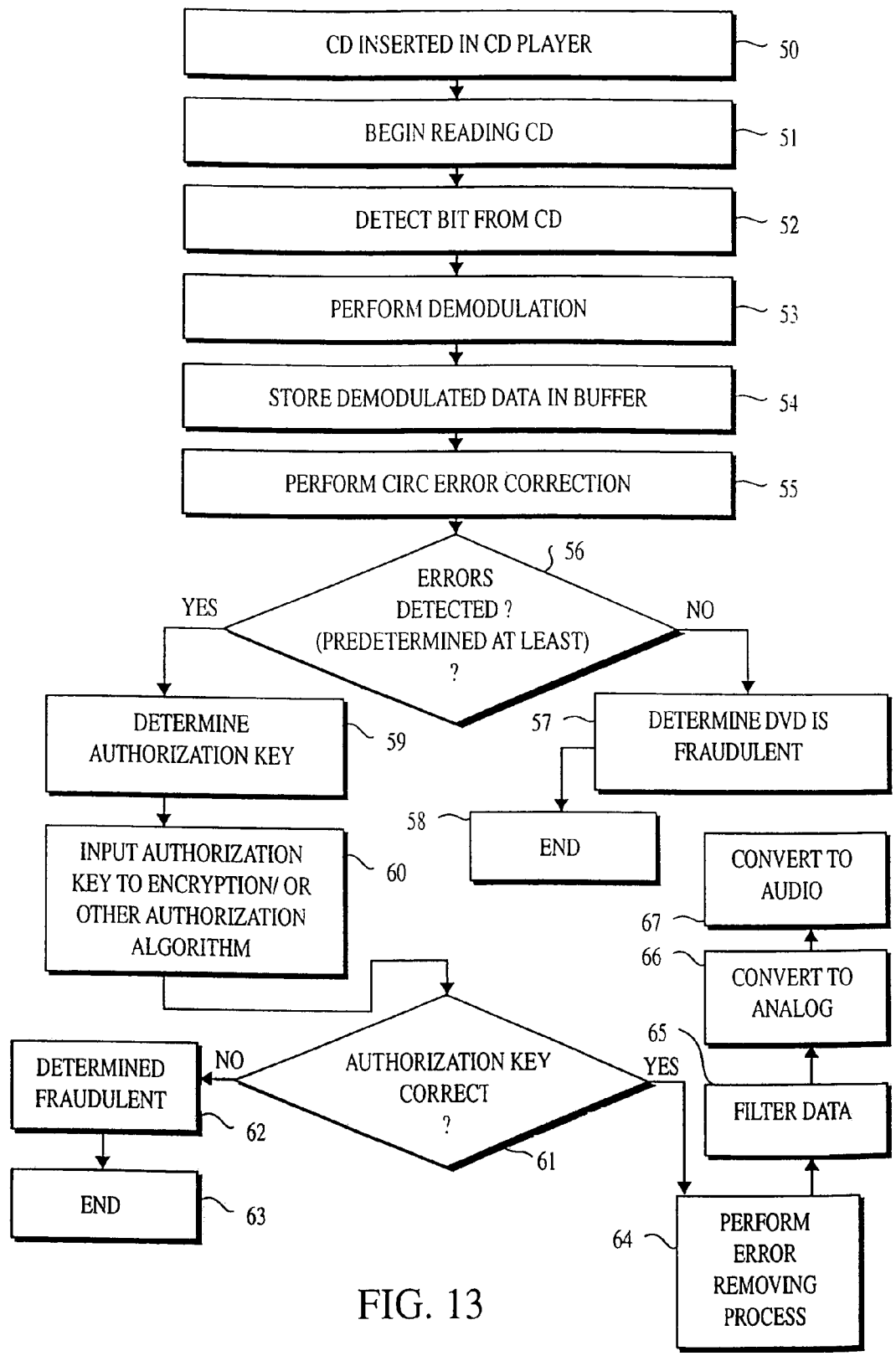
FIG. 13 shows a flow chart of the decision logic describing the authentication process of a CD to be played on a CD player.

FIG. 13 illustrates a flow chart of the decision logic describing operation of a disc player when attempting to play a CD in accordance with one embodiment of the invention. The process begins at 50 when CD 20 is inserted in a CD player 22. The player 22 begins reading the CD 20, (Step 51), by detecting bits from the disc=s surface (Step 52). Once the data is recovered, the data is demodulated using, for example, eight-to-fourteen modulation (Step 53). The demodulated data is sent to a buffer (Step 54), and forwarded for CIRC error correction (Step 55).

At Step 56, the player's circuitry or processes must determine whether the data on CD 20 contains the intentionally embedded predetermined errors. If not, the disc is determined to be fraudulent (Step 57), and player 22 ends playback activity (Step 58). On the other hand, if it is found that the disc 20 contains predetermined errors, the next Step 59 is to read those errors and determine authentication key(s), an operation performed by an authentication algorithm located within authentication module 23. player 22 will have a component corresponding to the authentication key(s) on disc 20. If comparison of the component with the key(s) does not match, CD 20 is determined to be fraudulent (Step 62) and playback activity ends (Step 63).

If, on the other hand, it is determined that the component correctly matches the authentication key(s), the player=s circuitry is triggered to begin the error removal process (Step 64) in which predetermined errors are removed, data is filtered (Step 65) and ultimately converted to sensible audible output data (Steps 66, 67). While the above description focuses on a particular sequence of process steps, the present invention may alternatively be used via a different sequence of the above described steps.

Figure 14:
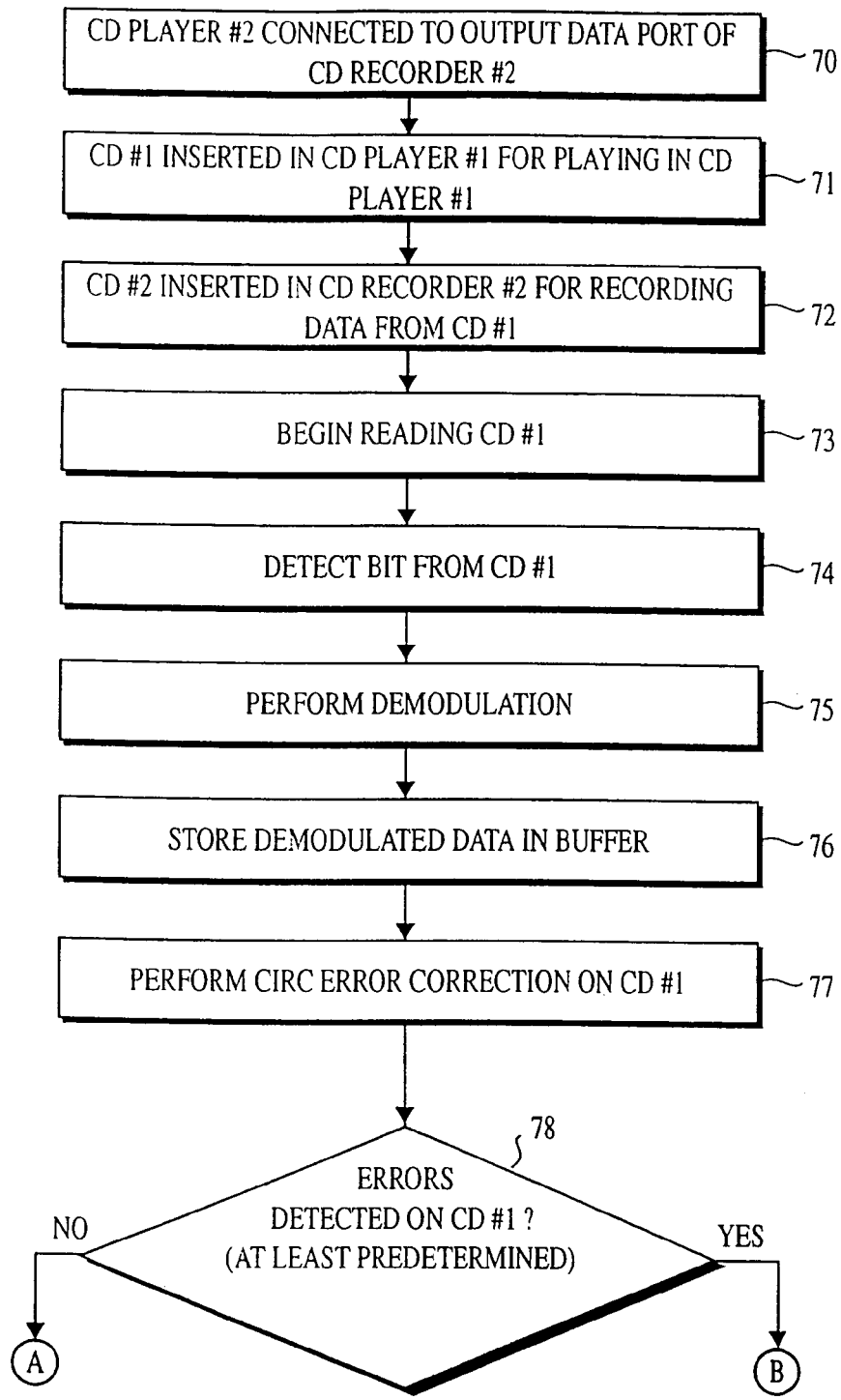
FIGS. 14–17 show a flow chart of the decision logic describing the authentication process of a CD to be copied by CD recorder.

FIG. 14 illustrates a flow chart of the decision logic describing operations when a first CD plays the data to be recorded by a second CD. For simplicity, the CD player will be referenced as player #1, and the CD recorder will be referenced as recorder #2. Also, the first CD played by player #1 will be referenced as CD #1, and the second CD recorded by recorder #2 will be referenced as CD #2.

At inception, (Step 70), CD player #1 is connected to the output port of recorder #2, or other standard means for capturing the output of player #1. Playback begins when CD #1 is inserted into player #1 (Step 71). Recording begins when CD #2 is inserted into recorder #2 (Step 72). The next step in CD player #1 is the reading of CD #1, (step 73), by detecting bits contained on the surface of CD #1 (Step 74).

Once the data is recovered, the data is demodulated using, for example, eight-to-fourteen modulation or other standard modulation (Step 75). The demodulated data is transferred and stored in a buffer, (Step 76). CIRC error correction is then performed on the demodulated data (Step 77).

Figure 15:
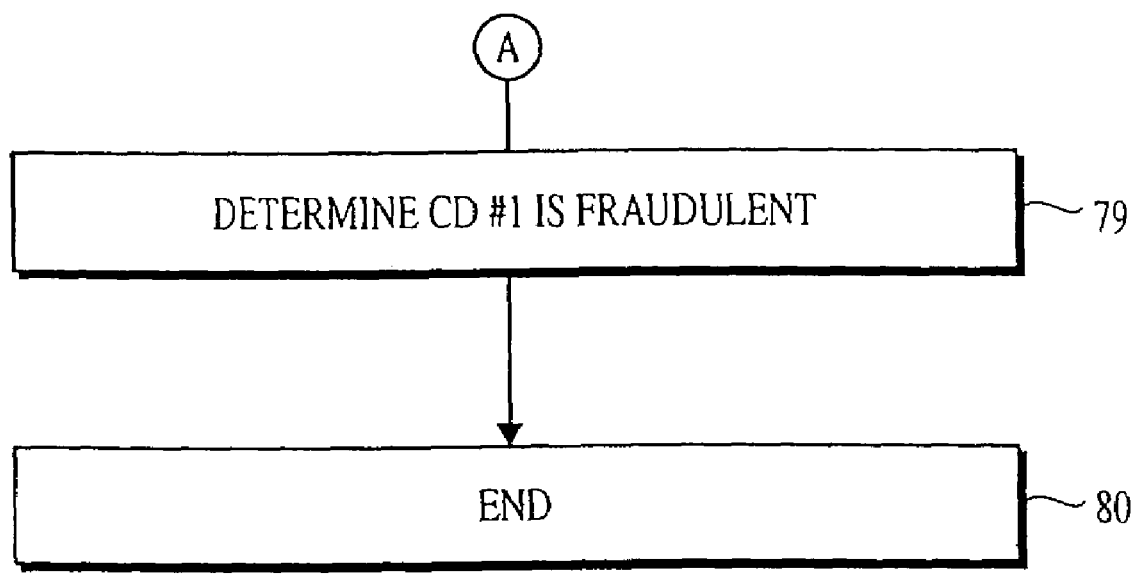

At Step 78 depicted in FIG. 15, the player=s circuitry must determine whether the data on CD #1 contains the intentionally embedded predetermined errors. If not, the disc is determined to be fraudulent, (Step 79), and player #1 ends playback activity (Step 80). See FIG. 15.

Figure 16:
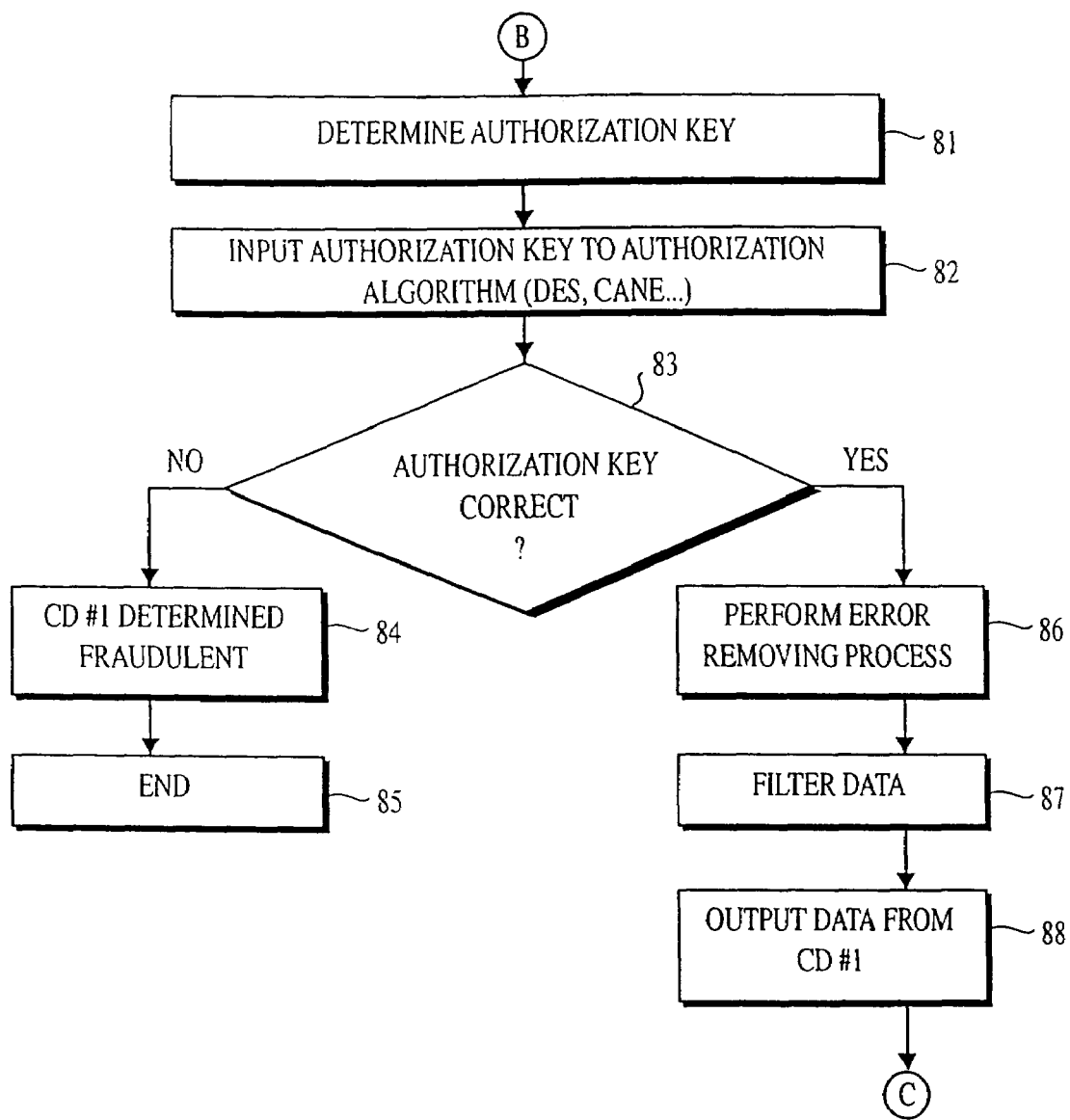

On the other hand, if it is found that the CD #1 contains predetermined errors, the next step 81 in FIG. 16 is to read those errors and determine authentication key(s). Any standard authentication algorithm may be used, such as data encryption standard (DES) and the like, located within the authentication module of CD player #1. See FIG. 16.

Once the authentication key(s) is/are read into the authentication algorithm, (Step 82), in a standard manner, and it is then determined whether the authentication key(s) is/are correct (Step 83). The authentication algorithm in CD player #1 will have a component corresponding to the authentication key(s) on CD #1. If comparison of the component with the key(s) does not match, CD #1 is determined to be fraudulent, (Step 84), and playback activity ends. (Step 85)

If, on the other hand, it is determined in Step 83 that the component correctly matches the authentication key(s), the player=s circuitry is triggered to begin the error removal process, (Step 86), in which predetermined errors are removed, and the data is filtered (Step 87) and ultimately converted to sensible audible output data (Step 88).

Figure 17:
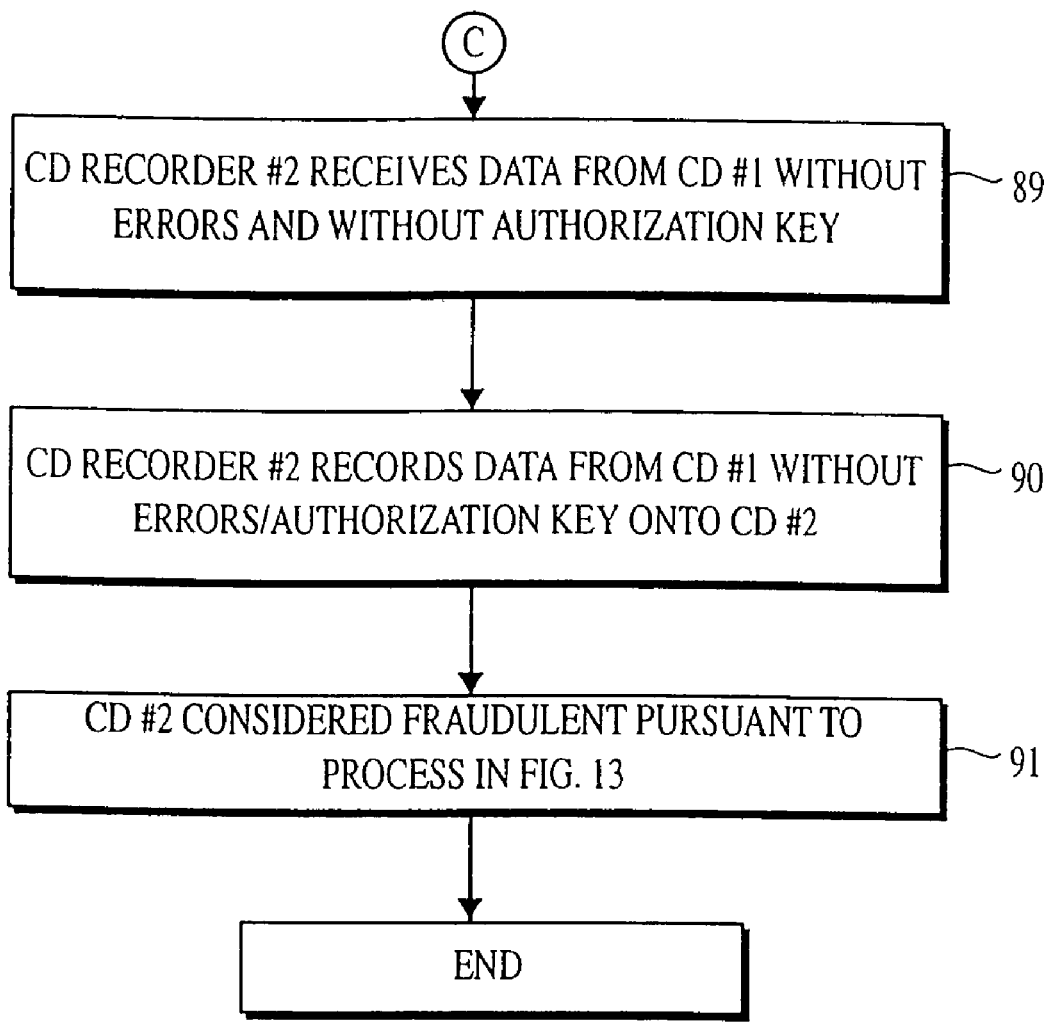

Referring to FIG. 17, at this juncture, the authentication process for playing the CD is completed, and recorder #2 receives the audio data from CD #1 (Step 89). This data is free of predetermined errors and the authentication key(s). Upon receipt, CD recorder #2 records the data onto CD #2, a copy (Step 90). If CD #2 is later inserted into a CD player of the present invention, (e.g., a CD player equipped with a fraud detector), it will be determined to be a fraudulent CD pursuant to the above-mentioned process of FIG. 13, because CD #2 does not contain the requisite predetermined errors for authentication since these errors were not transferred in the data, such as the audio data (Step 91).

Figure 18:
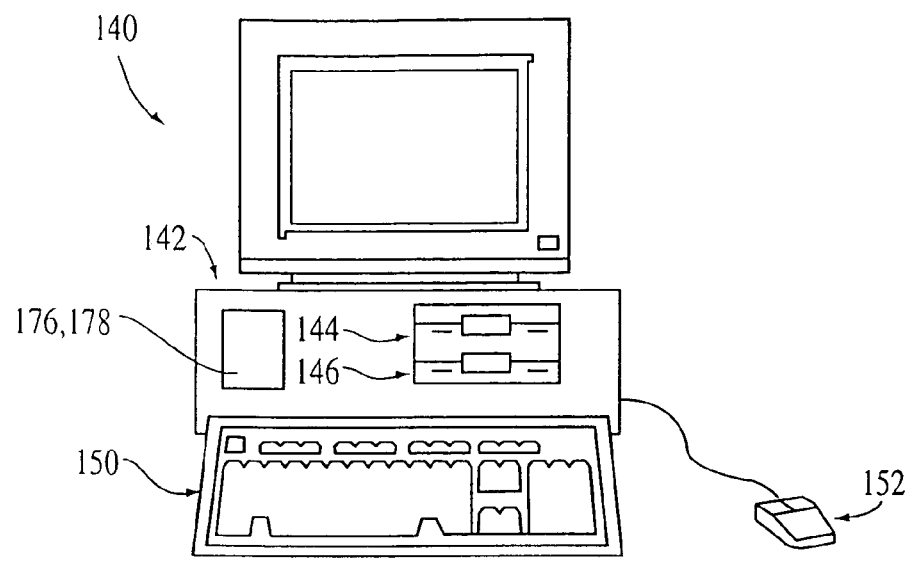
FIG. 18 is an illustration of a main central processing unit for implementing the computer processing in accordance with a computer implemented embodiment of the present invention, when the data player and/or recorder is part of a personal computing system.

FIG. 18 is an illustration of a main central processing unit for implementing the computer processing in accordance with a computer implemented embodiment of the present invention, when the data player and/or recorder is part of a personal computing system. The procedures described above may be presented in terms of program procedures executed on, for example, a computer or network of computers.

Viewed externally in FIG. 18, a computer system designated by reference numeral 140 has a central processing unit 142 having disk drives 144 and 146. Disk drive indications 144 and 146 are merely symbolic of a number of disk drives which might be accommodated by the computer system. Typically these would include a floppy disk drive such as 144, a hard disk drive (not shown externally) and a CD ROM indicated by slot 146. The number and type of drives varies, typically with different computer configurations. Disk drives 144 and 146 are in fact optional, and for space considerations, may easily be omitted from the computer system used in conjunction with the production process/apparatus described herein.

The computer also has an optional display 148 upon which information is displayed. In some situations, a keyboard 150 and a mouse 152 may be provided as input devices to interface with the central processing unit 142. Then again, for enhanced portability, the keyboard 150 may be either a limited function keyboard or omitted in its entirety. In addition, mouse 152 may be a touch pad control device, or a track ball device, or even omitted in its entirety as well. In addition, the computer system also optionally includes at least one infrared transmitter 176 and/or infrared receiver 178 for either transmitting and/or receiving infrared signals, as described below.

Figure 19:
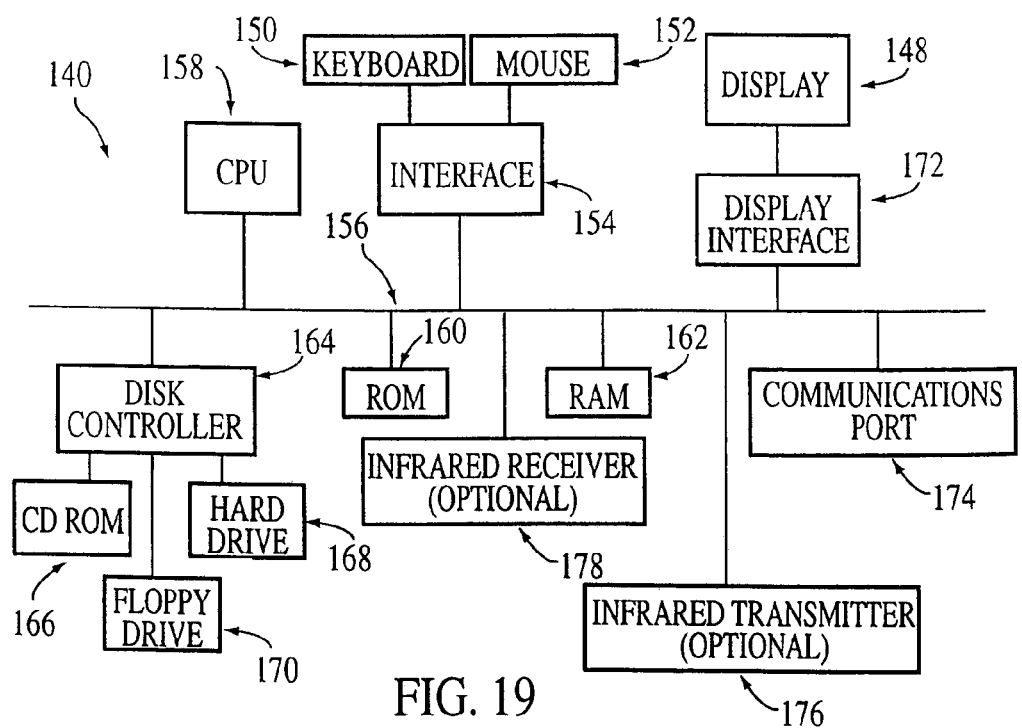
FIG. 19 illustrates a block diagram of the internal hardware of the computer of FIG. 18.

FIG. 19 illustrates a block diagram of the internal hardware of the computer of FIG. 18. A bus 156 serves as the main information highway interconnecting the other components of the computer. CPU 158 is the central processing unit of the system, performing calculations and logic operations required to execute a program. Read only memory (ROM) 160 and random access memory (RAM) 162 constitute the main memory of the computer. Disk controller 164 interfaces one or more disk drives to the system bus 156. These disk drives may be floppy disk drives such as 170, or CD ROM or DVD (digital video disks) drive such as 166, or internal or external hard drives 168. As indicated previously, these various disk drives and disk controllers are optional devices.

A display interface 172 interfaces display 148 and permits information from the bus 156 to be displayed on the display 148. Again as indicated, display 148 is also an optional accessory. For example, display 148 could be substituted or omitted. Communication with external devices, for example, the components of the apparatus described herein, occurs utilizing communication port 174. For example, optical fibers and/or electrical cables and/or conductors and/or optical communication (e.g., infrared, and the like) and/or wireless communication (e.g., radio frequency (RF), and the like) can be used as the transport medium between the external devices and communication port 174.

In addition to the standard components of the computer, the computer also optionally includes at least one of infrared transmitter 176 or infrared receiver 178. Infrared transmitter 176 is utilized when the computer system is used in conjunction with one or more of the processing components/stations that transmits/receives data via infrared signal transmission.

Figure 20:
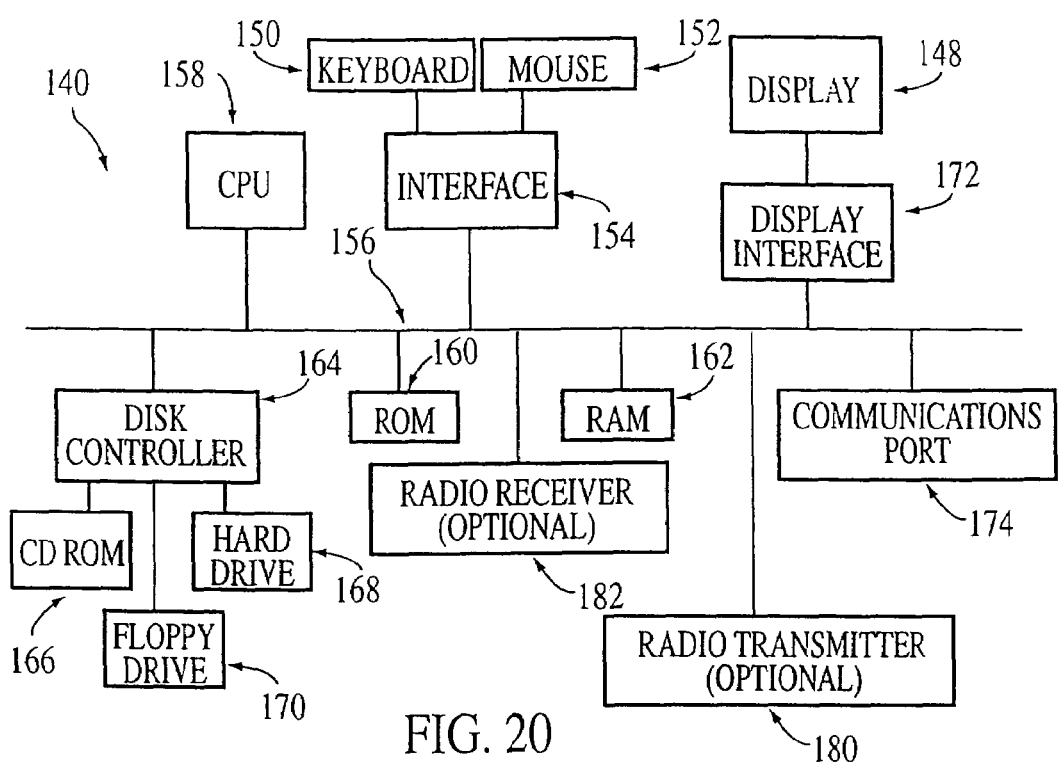
FIG. 20 is a block diagram of the internal hardware of the computer of FIG. 18 in accordance with a second embodiment.

FIG. 20 is a block diagram of the internal hardware of the computer of FIG. 18 in accordance with a second embodiment. In FIG. 20, instead of utilizing an infrared transmitter or infrared receiver, the computer system uses at least one of a low power radio transmitter 180 and/or a low power radio receiver 182. The low power radio transmitter 180 transmits the signal for reception by components of the production process, and receives signals from the components via the low power radio receiver 182. The low power radio transmitter and/or receiver 180, 182 are standard devices in industry.

Figure 21:
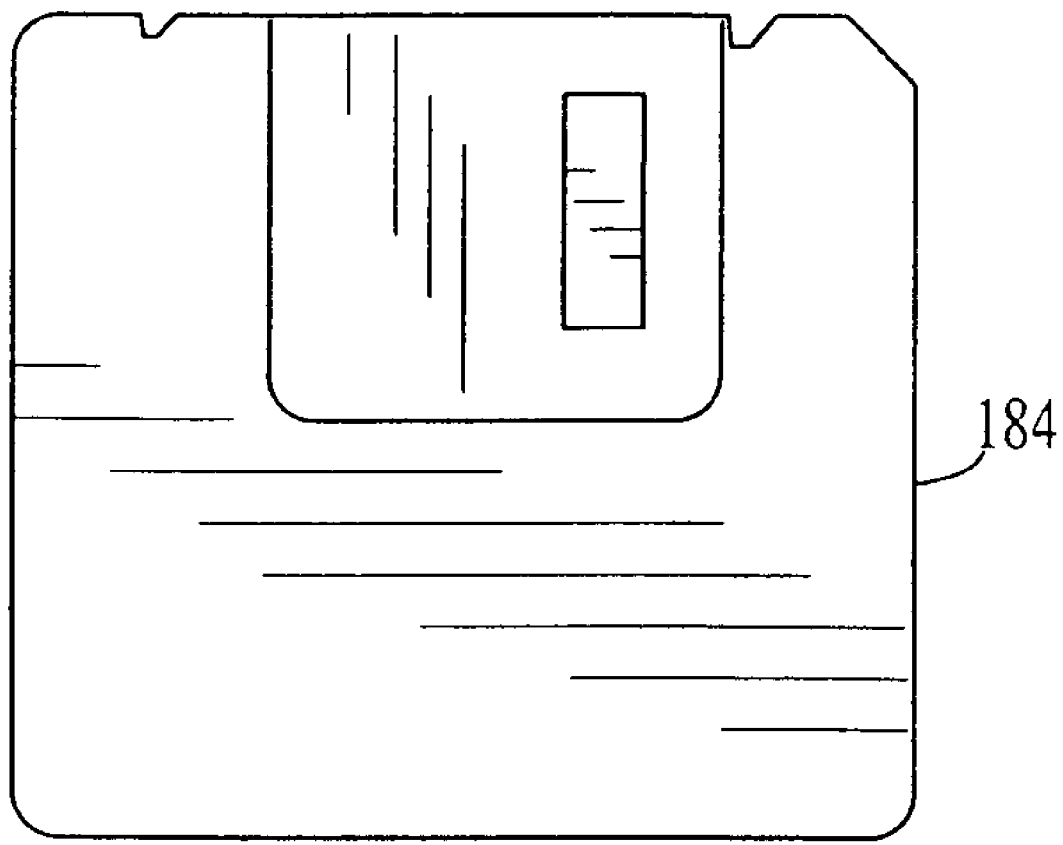
FIG. 21 is an illustration of an exemplary memory medium which can be used with disk drives illustrated in FIGS. 18–20.

FIG. 21 is an illustration of an exemplary memory medium which can be used with disk drives illustrated in FIGS. 18–20. Typically, memory media such as floppy disks, or a CD ROM, or a digital video disk will contain, for example, a multi-byte locale for a single byte language and the program information for controlling the computer to enable the computer to perform the functions described herein. Alternatively, ROM 160 and/or RAM 162 illustrated in FIGS. 19–20 can also be used to store the program information that is used to instruct the central processing unit 158 to perform the operations associated with the production process.

Although processing system 140 is illustrated having a single processor, a single hard disk drive and a single local memory, processing system 140 may suitably be equipped with any multitude or combination of processors or storage devices. Processing system 140 may, in point of fact, be replaced by, or combined with, any suitable processing system operative in accordance with the principles of the present invention, including sophisticated calculators,and hand-held, laptop/notebook, mini, mainframe and super computers, as well as processing system network combinations of the same.

Conventional processing system architecture is more fully discussed in *Computer Organization and Architecture,* by William Stallings, MacMillam Publishing Co. (3rd ed. 1993); conventional processing system network design is more fully discussed in *Data Network Design,* by Darren L. Spohn, McGraw-Hill, Inc. (1993), and conventional data communications is more fully discussed in *Data Communications Principles,* by R. D. Gitlin, J. F. Hayes and S. B. Weinstain, Plenum Press (1992) and in *The Irwin Handbook of Telecommunications,* by James Harry Green, Irwin Professional Publishing (2nd ed. 1992). Each of the foregoing publications is incorporated herein by reference.

Alternatively, the hardware configuration may be arranged according to the multiple instruction multiple data (MIMD) multiprocessor format for additional computing efficiency. The details of this form of computer architecture are disclosed in greater detail in, for example, U.S. Pat. No. 5,163,131; Boxer, A., Where Buses Cannot Go, IEEE Spectrum, February 1995, pp. 41–45; and Barroso, L. A. et al., RPM: A Rapid Prototyping Engine for Multiprocessor Systems, IEEE Computer February 1995, pp. 26–34, all of which are incorporated herein by reference.

In alternate preferred embodiments, the above-identified processor, and in particular microprocessing circuit 158, may be replaced by or combined with any other suitable processing circuits, including programmable logic devices, such as PALs (programmable array logic) and PLAs (programmable logic arrays). DSPs (digital signal processors), FPGAs (field programmable gate arrays), ASICs (application specific integrated circuits), VLSIs (very large scale integrated circuits) or the like.

Figure 22:
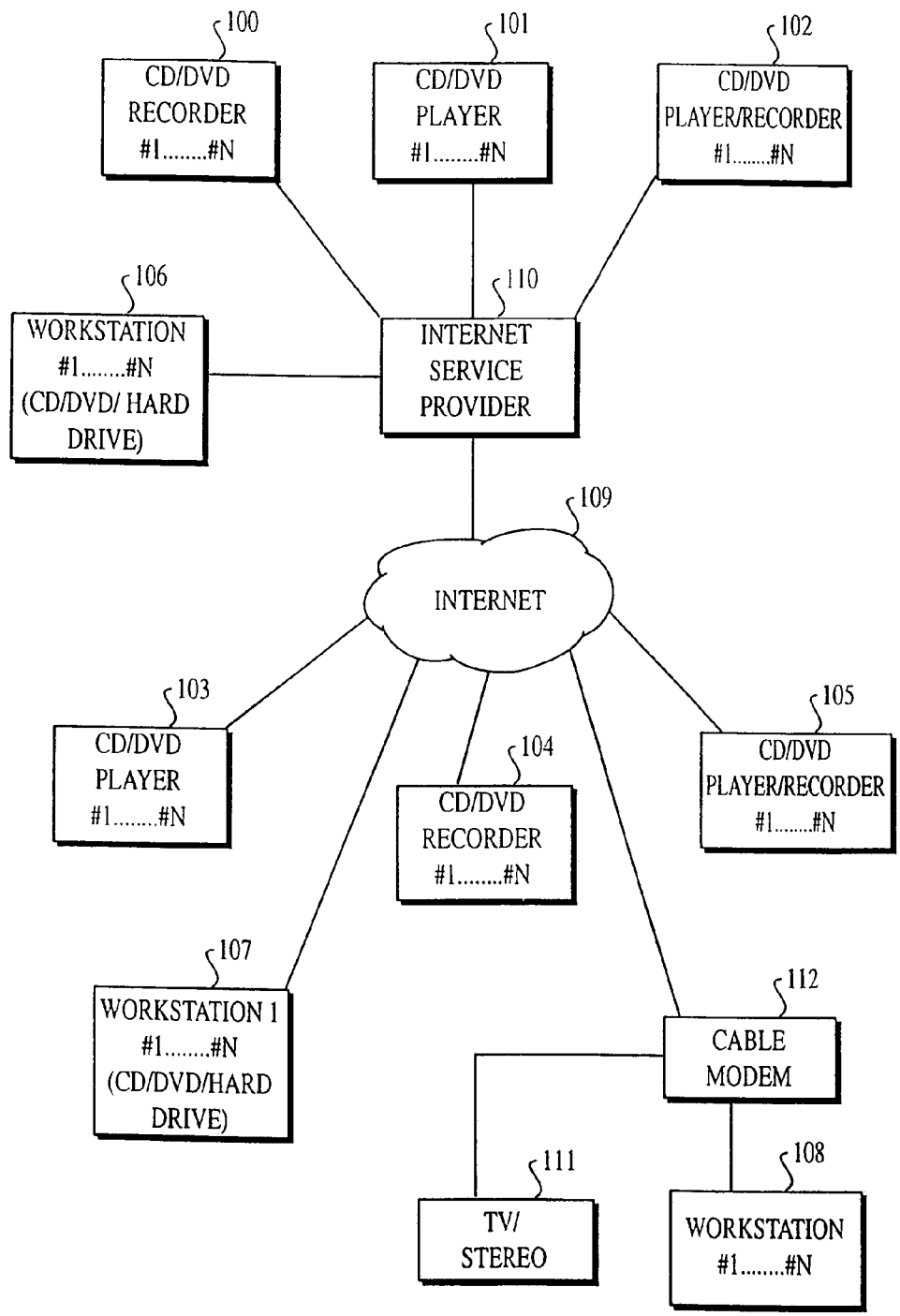
FIG. 22 shows a plurality of disc players, disc recorders and workstations connected to a global network, such as the Internet.

FIG. 22 shows a plurality of disc players and disc recorders 100–105, and workstations 106–108 connected to a global network, such as the Internet 109, via an Internet Service Provider 110, in accordance with one embodiment. The above system also accommodates Internet access to electronic audio/video data files through home electronic equipment, such as television/stereos 111 and cable/modem 112. Thus, data may emanate from, or be transmitted to, any one of these stations or devices.

Figure 23:
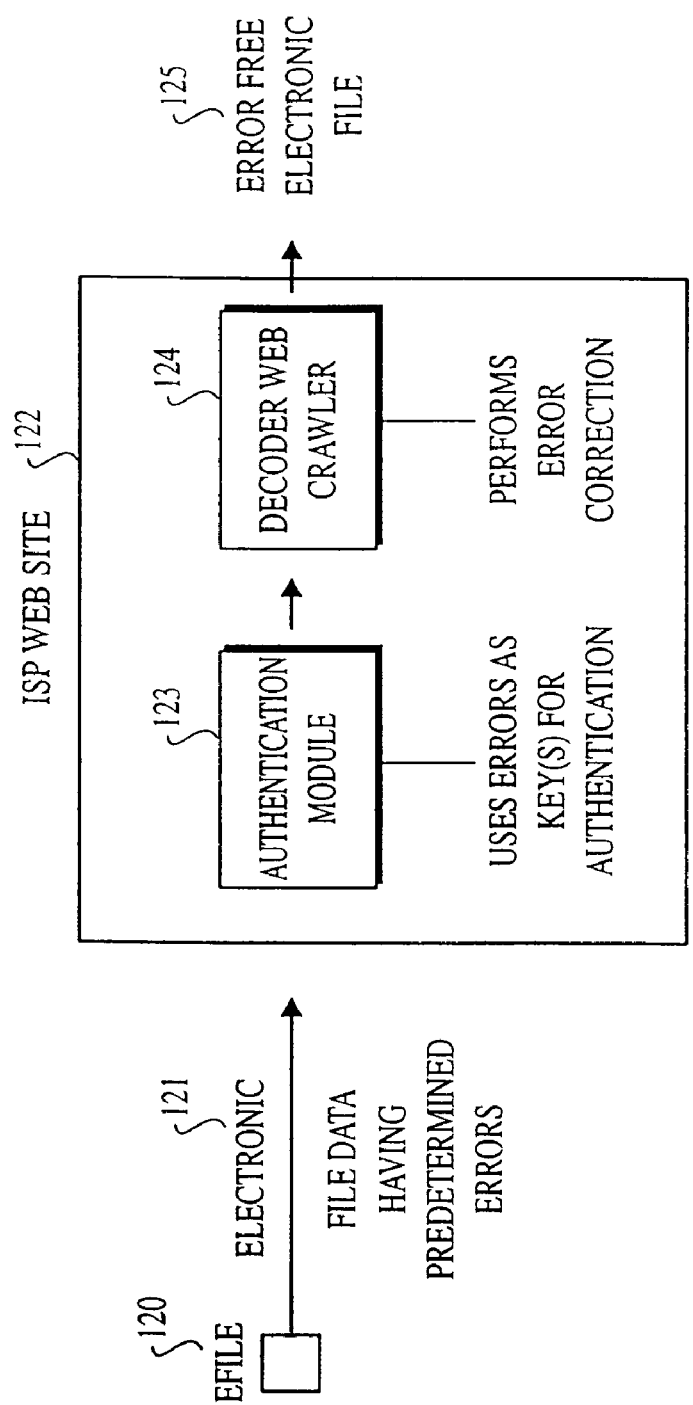
FIG. 23 shows a block diagram of the process by which predetermined errors are intentionally embedded in an electronic audio/video data file, and are used as a key or keys for authenticating the efile.
Figure 24:
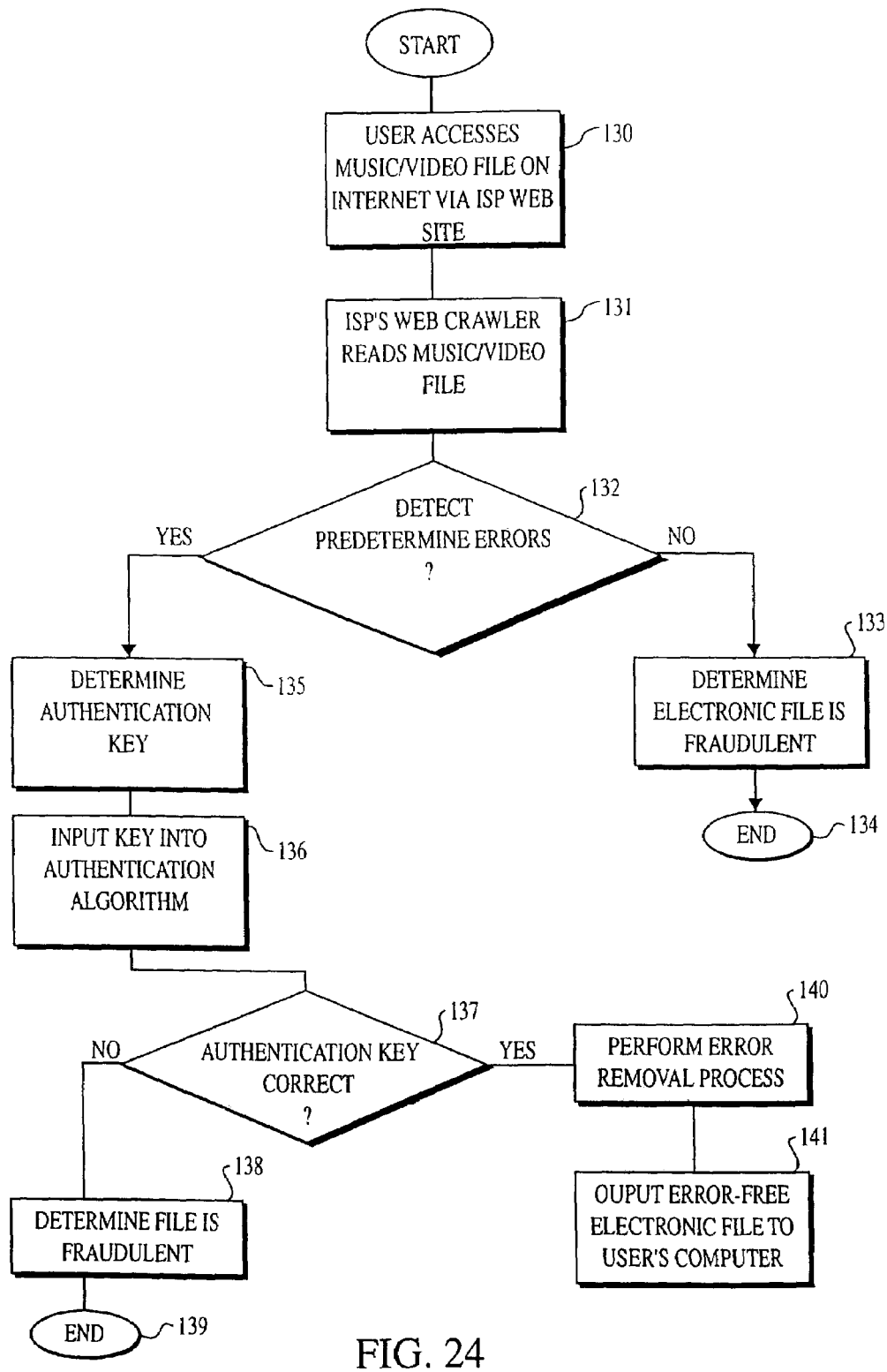
FIG. 24 shows a flow chart of the decision logic describing the authentication process of an electronic audio/video data file retrieved via the Internet for playing.

FIGS. 23–24 replicate the process shown generally in FIGS. 11 and 13–17, but as it applies to Internet-related playing and copying. For instance, FIG. 23 shows a block diagram of the process by which predetermined errors are intentionally embedded in audio or video data stored in an electronic file, and are used as an authentication key or keys for authenticating the existence of a non-pirated efile. The process begins with a data media, which may be a disc, a computer or a network of computers, such as the Internet, capable of storing data.

In this embodiment, the data is an electronic video or audio data file ("efile") 120 into which predetermined errors are intentionally embedded. These errors are mixed and edited with the original video or audio data and stored in the efile.

The resulting data ("efile data") 121 containing predetermined errors is transmitted into an authentication module 123 when efile 120 is requested by a user over the Internet. Authentication module 123 is disposed, for example, at the ISP=s web site 122, which uses the predetermined errors in efile data 121 as keys for authenticating whether efile 120 is a non-pirated file. Once efile 120 is authenticated, authentication module 123 transfers data 121 to a decoder web crawler 124, which intakes the data, manipulates it, performs error correction and outputs corrected data 125. The new corrected data 125 is free of predetermined errors and contains the original (audio and/or video) data only.

The above description is one example of the architecture used to implement the present invention, and other architectures may also be used. For example, the ISP website and/or server need not physically house or contain the authentication or decoder modules, but one or both of these devices may be disposed remote to the ISP website and/or server.

FIG. 24 illustrates a flow chart of the decision logic describing the authentication process of an electronic audio/video data file retrieved via the Internet for playing. The process begins at 130 when a user accesses music and/or video file(s) on the Internet via an ISP=s web site 124. The ISP=s decoder web crawler 124 begins reading the efile 120, (Step 131), looking for predetermined errors (Step 132). If no errors are found, efile 120 is determined to be fraudulent, (Step 133), and efile 120 is not transmitted to the user (Step 134). Thus, unauthorized access is prevented.

On the other hand, if it is found that efile 120 contains predetermined errors, the next Step 135 is to read those errors and determine the authentication key(s), an operation performed by an authentication algorithm located within authentication module 123.

Once the authentication key(s) is/are read into the authentication algorithm, (Step 136), it is then determined whether the authentication key(s) is/are correct (Step 137). The authentication algorithm at the ISP=s web site 122 will have a component corresponding to the authentication key(s) in efile 120. If comparison of the component with the key(s) does not match, efile 120 is determined to be fraudulent, (Step 138), and efile 120 is not transmitted to the user (Step 139).

If, on the other hand, it is determined that the component correctly matches the authentication key(s), error correction occurs, (Step 140), in which predetermined errors are removed, data is filtered, data is converted to sensible audio and/or video output data, and ultimately transmitted to the user. (Step 141).

Figure 25:
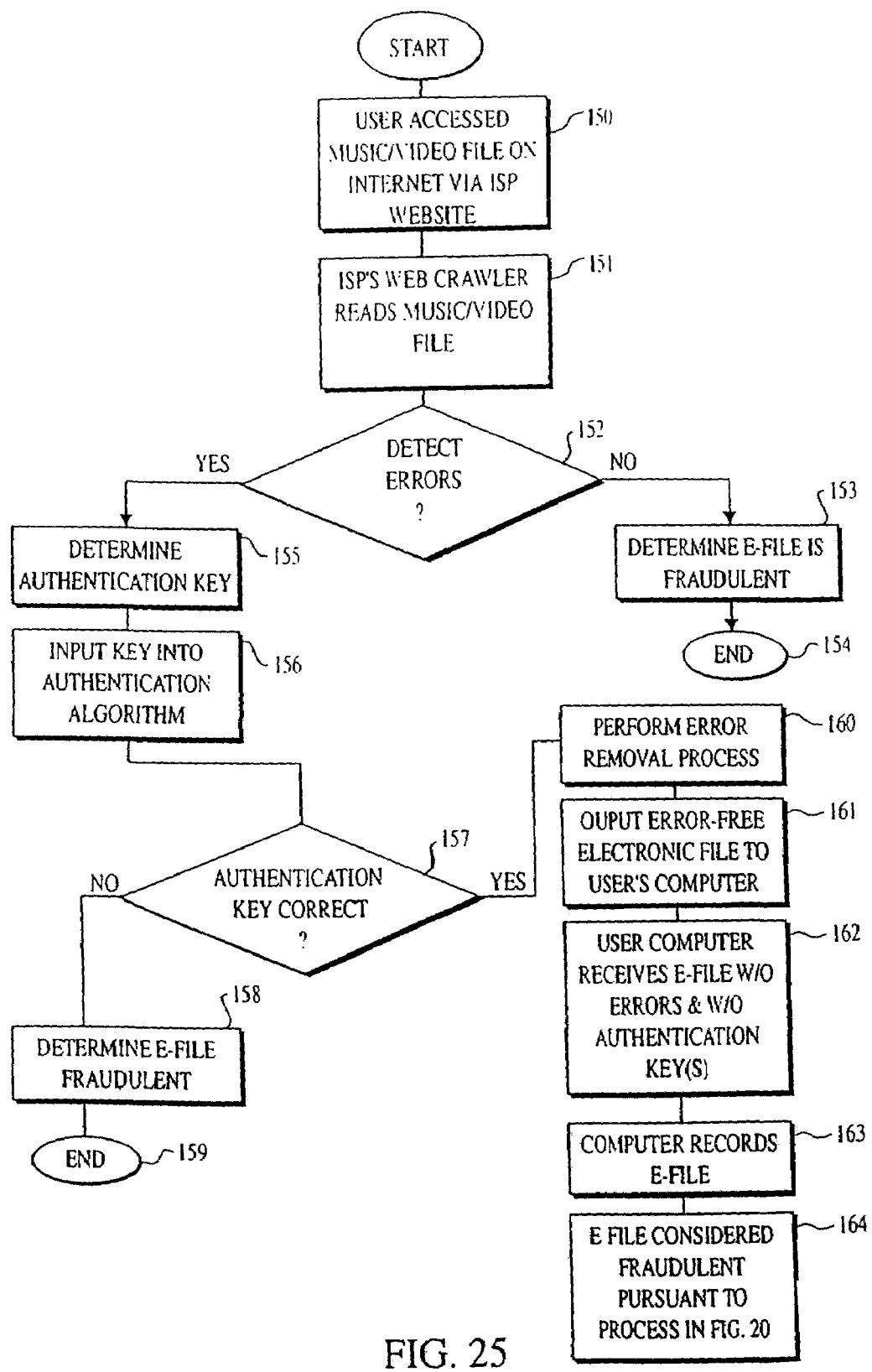
FIG. 25 shows a flow chart of the decision logic describing the authentication process of an electronic audio/video data file retrieved via the Internet for copying.

FIG. 25 illustrates a flow chart of the decision logic describing the authentication process of an electronic audio/video data file retrieved via the Internet for copying. The process begins at 150 when a user accesses music and/or video file(s) on the Internet via an ISP=s web site 124. The ISP=s decoder web crawler 124 begins reading the efile 120, (step 151), looking for predetermined errors (Step 152). If no errors are found, efile 120 is determined to be fraudulent, (Step 153), and efile 120 is not transmitted to the user (Step 154). Thus, unauthorized access is prevented.

On the other hand, if it is found that efile 120 contains predetermined errors, the next Step 155 is to read those errors and determine the authentication key(s), an operation performed by an authentication algorithm located within authentication module 123.

Once the authentication key(s) is/are read into the authentication algorithm, (Step 156), it is then determined whether the authentication key(s) is/are correct (Step 157). The authentication algorithm at the ISP=s web site 122 will have a component corresponding to the authentication key(s) in efile 120. If comparison of the component with the key(s) does not match, efile 120 is determined to be fraudulent, (Step 158), and efile 120 is not transmitted to the user (Step 159).

If, on the other hand, it is determined that the component correctly matches the authentication key(s), error correction occurs, (Step 160), in which predetermined errors are removed, data is filtered, data is converted to sensible audio and/or video output data, and ultimately transmitted to the user (Step 161). The user=s computer receives an efile 120 free of predetermined errors and authentication key(s), (Step 162), at which point a user may record the efile 120 (Step 163). This efile 120 is considered fraudulent for purposes of future Internet use, pursuant to the process outlined in FIG. 24, because it does not contain the requisite predetermined errors for subsequent authentication.

Figure 26:
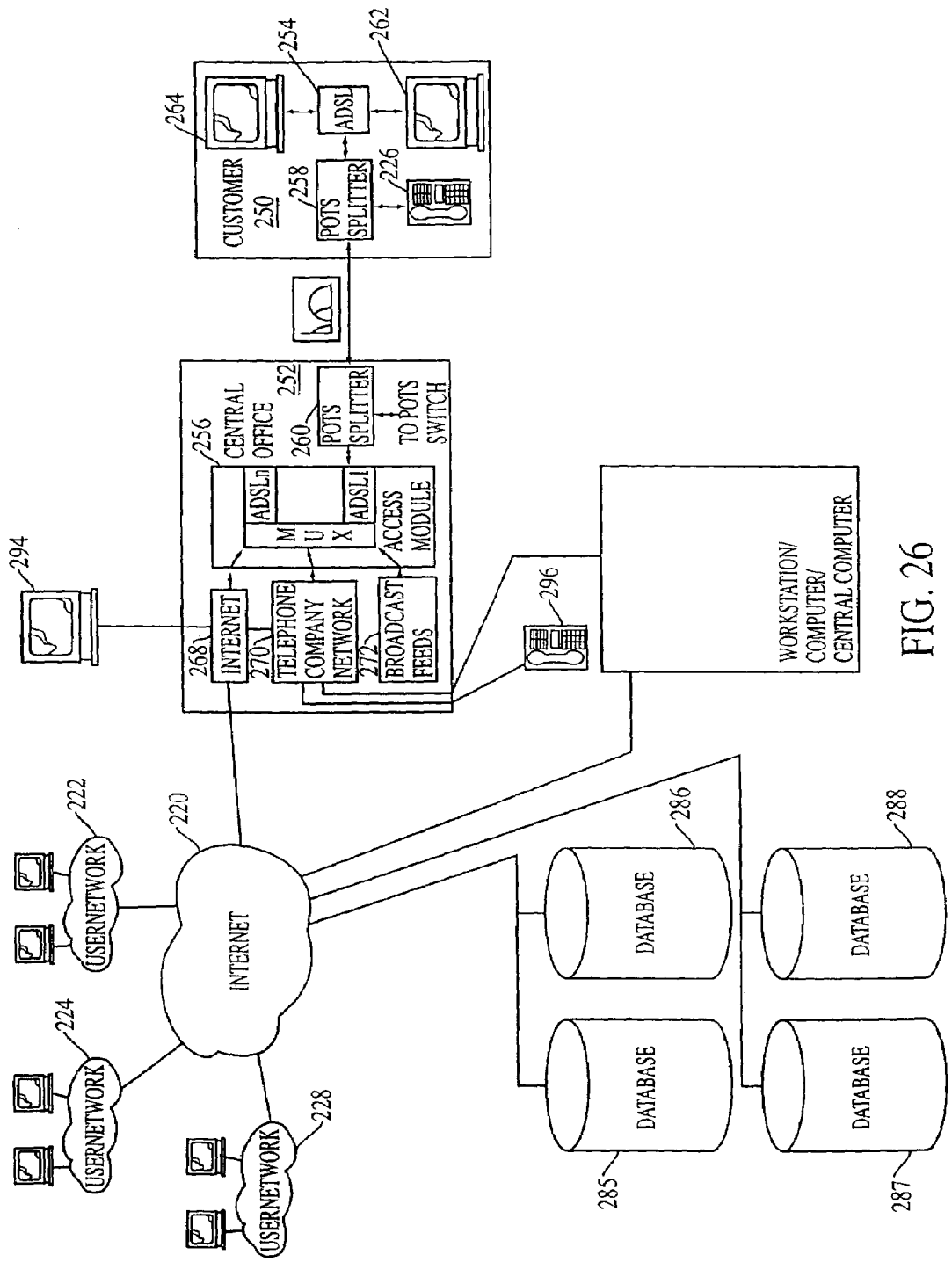
FIG. 26 is an illustration of the architecture of the combined internet, POTS, and ADSL architecture for use in the present invention in accordance with another design or embodiment.

FIG. 26 is an illustration of the architecture of the combined internet, POTS, and ADSL architecture for use in the present invention in accordance with another embodiment. In FIG. 21, to preserve POTS and to prevent a fault in the ADSL equipment 254, 256 from compromising analog voice traffic 226, 296 the voice part of the spectrum (the lowest 4 kHz) is optionally separated from the rest by a passive filter, called a POTS splitter 258, 260. The rest of the available bandwidth—from about 10 kHz to 1 MHz—carries data at rates up to 6 bits per second for every hertz of bandwidth from data equipment 262, 264, 294. The ADSL equipment 256 then has access to a number of destinations including significantly the Internet 268, and other destinations 270, 272.

To exploit the higher frequencies, ADSL makes use of advanced modulation techniques, of which the best known is the discrete multitone (DMT) technology. As its name implies, ADSL transmits data asymmetrically—at different rates upstream toward the central office 252 and downstream toward the subscriber 250.

Cable television providers are providing analogous Internet service to PC users over their TV cable systems by means of special cable modems. Such modems are capable of transmitting up to 30 Mb/s over hybrid fiber/coax systems, which use fiber to bring signals to a neighborhood and coax to distribute it to individual subscribers.

Cable modems come in many forms. Most create a downstream data stream out of one of the 6-MHz TV channels that occupy spectrum above 50 MHz (and more likely 550 MHz) and carve an upstream channel out of the 5–50-MHz band, which is currently unused. Using 64-state quadrature amplitude modulation (64 QAM), a downstream channel can realistically transmit about 30 Mb/s (the oft-quoted lower speed of 10 Mb/s refers to PC rates associated with Ethernet connections). Upstream rates differ considerably from vendor to vendor, but good hybrid fiber/coax systems can deliver upstream speeds of a few megabits per second. Thus, like ADSL, cable modems transmit much more information downstream than upstream.

The internet architecture 220 and ADSL architecture 254, 256 may also be combined with, for example, user networks 222, 224, and 228. As illustrated in this embodiment, users may access or use or participate in the administration, management computer assisted program in computer 240 via various different access methods. In this embodiment, the various databases 285, 286, 287 and/or 288 which may be used to store content, data and the like, are accessible via access to and/or by computer system 240, and/or via internet/local area network 220.

The above embodiments are only to be construed as examples of the various different types of computer systems that may be utilized in connection with the computer assisted and/or implemented process of the present invention. Further, while the above description has focused on embedding predetermined errors on a specific media, such as a CD, the present invention may also be used to embed predetermined errors to a digital bit stream that is in the process of being transmitted from an originating area or device to a destination device. That is, the authentication process of the present invention may be used to authenticate a data stream or collection of data, as opposed to, or in addition to, authenticating a specific media which has been used to play the data.

The many features and advantages of the invention are apparent from the detailed specification. Thus, it is intended by the appended claims to cover all such features and advantages of the invention that fall within the true spirit and scope of the invention. Further, since numerous modifications and variations will readily occur to those skilled in the art, it is not desired to limit the invention to the exact construction and operation illustrated and described. Accordingly, all suitable modifications and equivalents may be resorted to, falling within the scope of the invention.

What is claimed is:

1. A method for authenticating at least one of a media and data stored on said media in order to prevent at least one of piracy, unauthorized access and unauthorized copying of the data stored on said media, wherein predetermined errors are introduced with the data and storing the data on said media, the predetermined errors comprising at least one authentication key or component thereof, for authenticating whether the at least one of said media and data is authorized, said method comprising the steps of:
    (a) reading the data from said media;
    (b) determining the predetermined errors from the data;
    (c) comparing the predetermined errors to the at least one authentication key or component thereof;
    (d) authenticating the at least one of the media and the data responsive to the comparing step;
    (e) removing the predetermined errors from the data via a decoding operation resulting in substantially the data; and
    (f) outputting the data as at least one of audio, video, audio data, video data and digital data substantially free of the predetermined errors.

2. A method according to claim 1, wherein the predetermined errors comprise on-off binary codes representing ones and zeros to represent a predetermined pattern usable as the at least one authentication key or component thereof.

3. A method according to claim 1, wherein said outputting step (f) further includes converting the data to a stereo analog signal without transferring, in the data, the predetermined errors used as the at least one authentication key or component thereof.

4. A method according to claim 1, wherein said method further includes the step of embedding both said predetermined errors and said data onto a data disc on at least one of a per track basis and on an interval basis throughout the disc, such that the authentication is performed at least for at least one of each track to be played, throughout playback and recording.

5. A method according to claim 1, wherein said authenticating step further includes the step of authenticating using a different authentication key for each track.

6. A method according to claim 1, further including the step of using a process defined in at least one of the configuring, intentionally embedding, introducing and outputting steps, as a multi-level authentication system containing at least two different authentication keys, each of which successively must be authenticated before said corrected data is finally output.

7. A method according to claim 1, further including the step of at least one of performing said method over a plurality of inter-connected computer networks comprising at least one of a local network, a global network, and the Internet.

8. A method according to claim 1, wherein said authenticating step further comprises authenticating the at least one of the media and the data, wherein the media is at least one of read from and recorded to at least one of a disc player, a disc recorder, a computer, a work station and a network of computers.

9. A method according to claim 1, wherein said reading step (a) further comprises the step of at least one of decoding and decrypting the data from said media.

10. A method for authenticating at least one of a media and data stored on said media in order to prevent at least one of piracy, unauthorized access and unauthorized copying of the data stored on said media, wherein at least one predetermined error is introduced with the data into mixed data and storing the data on said media, the at least one predetermined error comprising at least one authentication key or component thereof, for authenticating whether the at least one of said media and data is authorized; said method comprising the steps of:
    (a) reading the data;
    (b) detecting the at least one predetermined error from the data;
    (c) comparing the at least one predetermined error to the at least one authentication key or component thereof;
    (d) authenticating the at least one of the media and the data responsive to the comparing step;
    (e) removing the at least one predetermined error from the data resulting in substantially the data; and
    (f) outputting the data as at least one of audio, video, audio data, video data and digital data substantially free of the at least one predetermined error.

11. A method according to claim 10, wherein the predetermined errors comprise on-off binary codes representing ones and zeros to represent a predetermined pattern usable as the at least one authentication key or component thereof.

12. A method according to claim 10, wherein said outputting step (f) further includes converting the data to a stereo analog signal without transferring, in the data, the predetermined errors used as the at least one authentication key or component thereof.

13. A method according to claim 10, wherein said method further includes the step of embedding both said predetermined errors and said data onto a data disc on at least one of a per track basis and on an interval basis throughout the disc, such that the authentication is performed at least for at least one of each track to be played, throughout playback and recording.

14. A method according to claim 10, wherein said authenticating step further includes the step of authenticating using a different authentication key for each track.

15. A method according to claim 10, further including the step of using a process defined in at least one of the configuring, intentionally embedding, introducing and outputting steps, as a multi-level authentication system containing at least two different authentication keys, each of which successively must be authenticated before said corrected data is finally output.

16. A method according to claim 10, further including the step of at least one of performing said method over a plurality of inter-connected computer networks comprising at least one of a local network, a global network, and the Internet.

17. A method according to claim 10, wherein said authenticating step further comprises authenticating the at least one of the media and the data, wherein the media is at least one of read from and recorded to at least one of a disc player, a disc recorder, a computer, a work station and a network of computers.

18. A method according to claim 10, wherein said reading step (a) further comprises the step of at least one of decoding and decrypting the data from said media.

19. In a method for authenticating at least one of data stored to be stored on said media in order to prevent at least one of piracy, unauthorized access and unauthorized copying of the data, a computer data message at least one of stored, buffered and cached on a computer readable medium comprising at least one predetermined error introduced in the computer data message comprising the computer data message, the at least one predetermined error comprising at least one authentication key or component thereof, used in authenticating whether the computer data message is authorized, and wherein the predetermined errors are sufficiently minimal such that the at least one predetermined error is removed therefrom without substantially altering an audible component of the computer data message, and wherein the computer data message is transmitted substantially free of the at least one predetermined error preventing a destination processor from the at least one predetermined error comprising the at least one authentication key or component thereof, used in the authenticating whether the computer data message is authorized.

20. In a method according to claim 19, wherein the predetermined errors comprise on-off binary codes representing ones and zeros to represent a predetermined pattern usable as the at least one authentication key or component thereof.

21. In a method according to claim 19, wherein said outputting step (f) further includes converting the data to a stereo analog signal without transferring, in the data, the predetermined errors used as the at least one authentication key or component thereof.

22. In a method according to claim 19, wherein said method further includes the step of embedding both said predetermined errors and said data onto a data disc on at least one of a per track basis and on an interval basis throughout the disc, such that the authentication is performed at least for at least one of each track to be played, throughout playback and recording.

23. In a method according to claim 19, wherein said authenticating step further includes the step of authenticating using a different authentication key for each track.

24. In a method according to claim 19, further including the step of using a process defined in at least one of the configuring, intentionally embedding, introducing and outputting steps, as a multi-level authentication system containing at least two different authentication keys, each of which successively must be authenticated before said corrected data is finally output.

25. In a method according to claim 19, further including the step of at least one of performing said method over a plurality of inter-connected computer networks comprising at least one of a local network, a global network, and the Internet.

26. In a method according to claim 19, wherein said authenticating step further comprises authenticating the at least one of the media and the data, wherein the media is at least one of read from and recorded to at least one of a disc player, a disc recorder, a computer, a work station and a network of computers.

27. In a method according to claim 19, wherein said reading step (a) further comprises the step of at least one of decoding and decrypting the data from said media.

* * * * *